US012568890B2

(12) United States Patent
Carroll

(10) Patent No.: US 12,568,890 B2
(45) Date of Patent: Mar. 10, 2026

(54) APPARATUS AND METHOD FOR CONTROLLING A GROWTH ENVIRONMENT OF A PLANT

(71) Applicant: Vivent SA, Gland (CH)

(72) Inventor: Caleb Carroll, Alberta (CA)

(73) Assignee: Vivent SA, Gland (CH)

( * ) Notice: Subject to any disclaimer, the term of this patent is extended or adjusted under 35 U.S.C. 154(b) by 35 days.

(21) Appl. No.: 18/245,829

(22) PCT Filed: Sep. 13, 2021

(86) PCT No.: PCT/EP2021/075144
§ 371 (c)(1),
(2) Date: Mar. 17, 2023

(87) PCT Pub. No.: WO2022/058289
PCT Pub. Date: Mar. 24, 2022

(65) Prior Publication Data
US 2024/0023490 A1     Jan. 25, 2024

(30) Foreign Application Priority Data
Sep. 17, 2020    (GB) ..................................... 2014673

(51) Int. Cl.
*G06N 20/00*        (2019.01)
*A01G 7/00*         (2006.01)

(52) U.S. Cl.
CPC ............... *A01G 7/00* (2013.01); *G06N 20/00* (2019.01)

(58) Field of Classification Search
CPC .................................. A01G 7/00; G06N 20/00
See application file for complete search history.

(56) References Cited

U.S. PATENT DOCUMENTS

2018/0267006 A1* 9/2018 Wallbridge ........ G01N 33/0098
2019/0050948 A1* 2/2019 Perry ................... A01B 79/005
2020/0196535 A1  6/2020 Dagondon et al.

FOREIGN PATENT DOCUMENTS

GB        2582547 A    9/2020
SU        886835 A1    7/1981
(Continued)

OTHER PUBLICATIONS

Goumopoulos et al., Automated Zone-Specific Irrigation with Wireless Sensor/Actuator Network and Adaptable Decision Support, Computers and Electronics in Agriculture 105 (2014), pp. 20-33, Mar. 2014. (Year: 2014).*

(Continued)

*Primary Examiner* — Marshall L Werner
(74) *Attorney, Agent, or Firm* — Dority & Manning, P.A.

(57)                ABSTRACT

There is provided a method of controlling a growth environment 50 of a plant 2, the method comprising: obtaining an electrical signal from the plant; generating, using at least one machine learning model, prediction data based upon the electrical signal, wherein the at least one machine learning model has been trained to assess at least one characteristic of the plant, and wherein the prediction data are based upon output(s) of the at least one machine learning model and indicate an assessment of the at least one characteristic of the plant; and applying a user defined rule set to the prediction data to generate a plant control signal, wherein the plant control signal is configured to change the growth environment of the plant.

12 Claims, 10 Drawing Sheets

(56)          References Cited

FOREIGN PATENT DOCUMENTS

WO      WO 2017/032750  A1      3/2017
WO      WO 2019/237200  A1      12/2019

OTHER PUBLICATIONS

Laksono et al., Lab Prototype of Wireless Monitoring and Control for Seed Potatoes Growing Chamber, Proceedings of the Asia-Pacific Advanced Network, Jun. 2014. (Year: 2014).*
James et al., Plant Growth Monitoring System, with Dynamic User Interface, Dec. 2016. (Year: 2016).*
Tran et al., Electrophysiological Assessment of Plant Status Outside a Faraday Cage using Supervised Machine Learning, Nov. 2019. (Year: 2019).*
International Search Report for Application No. PCT/EP2021/075144, mailed on Jan. 10, 2022, 3 pages.
Jingxia et al., "Study and Evaluation of Plant Electrical Signal Processing Method", Fourth International Congress on Image and Signal Processing, Oct. 15-17, 2011, Shanghai, China, pp. 2788-2791.
Search Report for Application No. GB 2014673.4, dated Mar. 4, 2021, 1 page.
Wang et al., "RBF Neural Networks Analysis on Electrical Signal in Chrysanthemum Coronarium" Sixth International Conference on Natural Computation, Aug. 10-12, 2010, Yantai, China, pp. 1446-1450.

* cited by examiner

S101

Introduce a stressor to a first plant or its growth environment

S102

Obtain a first electrical signal during a first time period when stressor is applied

S103

Obtain a second electrical signal during a second time period when stressor is not applied

S104

Process the first and second electrical signals to generate a training dataset

APPARATUS AND METHOD FOR CONTROLLING A GROWTH ENVIRONMENT OF A PLANT

This application is the U.S. National Stage entry of International Application No. PCT/EP2021/075144, filed on Sep. 13, 2021, which, in turn, claims priority to UK Patent Application No. 2014673.4, filed on Sep. 17, 2020, both of which are hereby incorporated by reference herein in their entirety for all purposes.

The present disclosure relates to a method, an apparatus and a system for controlling a growth environment of a plant.

It is known that electrical potential differences, or membrane potentials, are maintained across cell membranes in plants. However, it remains as a challenge to assess a health status of a plant with a reasonable-degree of confidence based upon an electrical signal obtained from the plant. It is further challenging to allow a user to easily and flexibly control a growth environment of the plant based upon the assessed health status of the plant.

Thus, there is a need to provide an improved method, apparatus and system for controlling a growth environment of a plant based upon an electrical signal obtained from the plant.

According to a first aspect of the present disclosure, there is provided a method of controlling a growth environment of a plant, the method comprising: obtaining an electrical signal from the plant; generating, using at least one machine learning model, prediction data based upon the electrical signal, wherein the at least one machine learning model has been trained to assess at least one characteristic of the plant, and wherein the prediction data are based upon output(s) of the at least one machine learning model and indicate an assessment of the at least one characteristic of the plant; and applying a user defined rule set to the prediction data to generate a plant control signal, wherein the plant control signal is configured to change the growth environment of the plant.

By applying a user defined rule set to the prediction data, which are based upon output(s) of the at least one machine learning model, the method allows the user to define the processing performed on the output(s) of the machine learning model in order to generate a plant control signal so as to change a growth environment of the plant. This is in contrast to the prior method of directly using the output of the machine learning model as a trigger to change the growth environment of the plant. In this way, the first aspect provides a more usable and versatile way to utilise machine learning in controlling the growth environment of the plant.

The method may be a computer implemented method.

The plant may be a single plant, and the electrical signal may comprise electrical signals obtained from the plant at multiple different times, and/or at multiple different parts of the plant.

Alternatively, the plant may be one of a group of plants, and electrical signals may be obtained from each of the plants. The prediction data may be generated based upon the electrical signals.

The electrical signal obtained from the plant may be in the time domain. The electrical signal may be obtained during periodic monitoring or continuous monitoring of the plant.

The at least one machine learning model may have been trained to access whether a stressor is present in a plant or in a growth environment of a plant. The stressor may be any factor which causes a change to the growth environment or the physiology of a plant. The stressor typically causes the plant to have a corresponding characteristic (e.g., light deficit/excess, water deficit/excess, nutrition deficit/excess, slow/fast metabolism, temperature deficit/excess, $CO_2$ deficit/excess, salt deficit/stress, insect infestation (such as, aphid attack), pathogen presence where a pathogen may be a virus, fungus or bacteria, premature or delayed growth, flowering or fruit maturing etc.) associated with the nature of the stressor. Therefore, plant characteristics are associated with the presence/absence of any stressor(s).

The prediction data may be the direct output(s) of the at least one machine learning model. Alternatively, the prediction data may be obtained by processing the output(s) of the at least one machine learning model.

The prediction data may comprise a plurality of prediction data items, each of which is based upon an output of the at least one machine learning model.

The at least one machine learning model may comprise a first machine learning model which has been trained to access a first characteristic of the plant. The prediction data may comprise first prediction data, which are based upon output(s) of the first machine learning model and indicate an assessment of the first characteristic of the plant.

The first prediction data may comprise a plurality of first prediction data items, each of which is based upon an output of the first machine learning model and indicates an assessment of the first characteristic of the plant. Applying the user defined rule set may comprise generating a first prediction result based upon the plurality of first prediction data items or a subset of the plurality of first prediction data items, wherein the user defined rule set is configured such that the plant control signal is generated based upon the first prediction result.

That is, the first prediction result may be generated based upon more than one of the first prediction data items. This is useful for dampening the fluctuations within the first prediction data items, and improves the accuracy of the assessment of the first characteristic of the plant. The fluctuations may result from prediction errors of the first machine learning model, or noise in the electrical signal obtained from the plant.

The plurality of first prediction data items may be generated by the first machine learning model at different times.

The plurality of first prediction data items may be time series data.

The first characteristic of the plant may be associated with the presence/absence of a first stressor to the plant.

The first machine learning model may comprise a regression model or a classification model (i.e., a classifier).

The first machine learning model may comprise a classifier.

The method may further comprise obtaining a plurality of first data samples from the electrical signal at a first sampling frequency. Generating the prediction data may comprise generating, using the first machine learning model, the plurality of first prediction data items based upon the plurality of first data samples, respectively.

At least one of the first data samples may comprise a data segment obtained by applying a window function to the electrical signal.

Applying a window function to the electrical signal may comprise multiplying the window function and the electrical signal. The window function may have non-zero values within a chosen time interval and may be zero-valued outside of the chosen time interval.

The data segments included within consecutive first data samples may be partially overlapping in time.

The first prediction result may be generated based upon a combination of the plurality of first prediction data items or a subset of the plurality of first prediction data items.

The term "combination" is intended to mean that all of the data items within the plurality of first prediction data items or a subset of the plurality of first prediction data items are taken into account in the generation of the first prediction result. Examples of the "combination" may include a sum, an average, a weighted sum, and/or a weighted average of the plurality of first prediction data items or a subset of the plurality of first prediction data items.

The first prediction result may comprise an average of the plurality of first prediction data items or a subset of the plurality of first prediction data items.

By generating an average of the plurality of first prediction data items or a subset of the plurality of first prediction data items, short-term fluctuations within the plurality of first prediction data items may be smoothed out, thereby improving the accuracy of the assessment of the first characteristic of the plant.

The first prediction result may comprise a moving average of a subset of the plurality of first prediction data. A size of the subset for calculating the moving average may be defined based upon a first user input.

A moving average may also be referred to as "rolling average" or "running average". Given a series of numbers and a fixed subset size, the first element of the moving average is obtained by taking the average of the initial fixed subset of the number series. Then the subset is modified by "shifting forward"; that is, excluding the first number of the series and including the next value in the series. A moving average is useful to smooth out short-term fluctuations and highlight longer-term trends. The threshold between short-term and long-term is defined by the size of the subset.

By allowing a user to set the size of the subset, the user is able to more efficiently process the outputs of the first machine learning model based upon the nature of the first characteristic of the plant. For example, if the first characteristic of the plant is associated with the presence/absence of a stressor (e.g., light deficit) which causes the plant to respond very quickly, the size of the subset may be set by the user to be a relatively small value; if the first characteristic of the plant is associated with the presence/absence of a stressor (e.g., pathogen presence) which causes the plant to respond in a much slower speed, the size of the subset may be set by the user to be a large value.

Applying the user defined rule set may comprise comparing the first prediction result to a first threshold value. The first threshold value may be defined based upon a second user input. The user defined rule set may be configured such that the plant control signal is generated based upon a result of the comparison.

The at least one machine learning model may comprise a second machine learning model which has been trained to access a second characteristic of the plant, and the second characteristic of the plant is different from the first characteristic of the plant. The prediction data may comprise second prediction data, which are based upon output(s) of the second machine learning model and indicate an assessment of the second characteristic of the plant.

The second prediction data may comprise at least one second prediction data item which is based upon an output of the second machine learning model and indicates an assessment of the second characteristic of the plant.

All of the optional features relating to and processing steps carried on the "first prediction data" described above may apply similarly to the "second prediction data".

The second characteristic of the plant may be associated with the present/absence of a second stressor to the plant. The second stressor may be different from the first stressor. The second machine learning model may comprise a regression model or a classification model (i.e., a classifier).

The second machine learning model may comprise a classifier.

The second machine learning model may be the same as the first machine learning model. Alternatively, the second machine learning model may be different from the first machine learning model.

Applying the user defined rule set may comprise performing a logic calculation based upon the first prediction data and the second prediction data. The logic calculation may be defined based upon a third user input. The user defined rule set may be configured such that the plant control signal is generated based upon a result of the logic calculation.

That is, the plant control signal may be generated based upon the output of two different machine learning models for assessing two different characteristics of the plant. The logic calculation is defined by the user based upon the nature of the characteristics of the plant assessed by the first and second machine learning models. For example, if the first machine learning model assesses whether the plant is water deficit, and the second machine learning model assesses whether the plant is temperature deficit, the user may define the logic calculation such that the plant control signal for activating water supply is generated only if the plant is water deficit but NOT temperature deficit. This is because it is normal for some types of plants to be water deficit at cold temperature. Using two different machine learning models allows the user to obtain a fuller picture of the characteristics of the plant. By further allowing the user to operate, via the user defined rule set, on the outputs of the first and second machine learning models, the user is able to more flexibly and more effectively control the growth environment of the plant.

In general, a logic calculation may be used to determine if a certain condition is true or false. The condition may be defined by the third user input. The condition may comprise user-defined mathematical calculation performed on at least some of the first prediction data and the second prediction data.

The logic calculation may comprise at least one logic connective. Examples of the logic connective include AND, OR, NOT, IF, THEN, FthenT (changing from False to True), TthenF (changing from True to False) etc.

Preforming the logic calculation may be based upon the result of the comparison and the second prediction data.

The electrical signal referred to above may be a first electrical signal, and the plant may be a first plant. The method may further comprise: obtaining a second electrical signal from a second plant which is separate from the first plant; generating, using the at least one machine learning model, further prediction data based upon the second electrical signal; and wherein applying the user defined rule set comprises applying the user defined rule set to the prediction data and the further prediction data to generate the plant control signal, wherein the plant control signal is configured to change the growth environment of the first plant and the second plant.

By applying the user defined rule set to the prediction data and the further prediction data to generate the plant control signal, the user is able to selectively use one or both of the prediction data and the further prediction data to generate the plant control signal so as to change the growth environment of the first plant and the second plant. This provides the user with more flexibility in controlling the growth environment of the plants, and also improves the robustness of the controlling system. For example, if the electrical signal obtained from a particular plant is noisy or contains an error signal (e.g., due to a faulty sensor), the prediction data generated based upon that electrical signal would be unreliable. The user defined rule set may allow the user to remove abnormal prediction data or prediction data which deviate from other prediction data, before the plant control signal is generated. In this way, the plant control signal would not be substantially affected by a problematic electrical signal obtained from the particular plant, and the growth environment of the particular plant can still be correctly controlled by the plant control signal.

The first plant and the second plant may be of the same type (or species).

Applying the user defined rule set may comprise disregard one of the prediction data and the further prediction data.

Applying the user defined rule set may comprise combining the prediction data and the further prediction data. More specifically, applying the user defined rule set may comprise calculating an average of the prediction data and the further prediction data.

The method may further comprise providing at least one device which is configured to change the growth environment of the plant based upon the plant control signal.

The at least one device may comprise one or more relays. The relays may be configured to control a heater, a fan, a lighting, a water pump, a pump which deliver a chemical substance to a growth medium of the plant, and/or a pesticide pump. Further or alternatively, the at least one device may comprise one or more smart devices, such as, a smart heater, a smart fan, a smart lighting device, a smart pump etc. Smart devices refer to electronic devices which are generally connected to other devices or networks via wireless protocols and can operate to some extent interactively and autonomously. The plant control signal may be configured to change an operation of the at least one device so as to change the growth environment of the plant. By changing the operation of the at least one device, it would be appreciated that an operational mode, a throughput and/or an output power of the device may be increased or decreased, or the device may be switched on or off.

The plant control signal may be transmitted to a controller of the at least one device. The controller may interpret the plant control signal and determine control information contained within the plant control signal. The at least one device may be configured to change the growth environment of the plant based upon the determined control information.

The plant control signal may be wirelessly transmitted to the controller.

The method may further comprise broadcasting the plant control signal.

By broadcasting the plant control signal, the recipient of the plant control signal is unspecified. This is in contrast to direct point-to-point signal transmission which specifies a particular device as a recipient, and is more efficient to communicate the plant control signal to multiple devices.

The method may further comprise applying a further user defined rule set to the at least one device, wherein the at least one device is configured to change the growth environment of the plant based upon the plant control signal and the further user defined rule set.

Applying the further user defined rule set allows a user to easily program the at least one device, and provides additional flexibility for a user to control the growth environment of the plant. When configuring the further user defined rule set, the user may take into account the characteristics of the plant, the purpose of the at least one device, and the content of the plant control signal, so as to create an ideal growth environment for the plant while minimising any wastage of resources.

The further user defined rule set may be configured to apply restrictions to the operation of the at least one device.

The further user defined rule set may be configured to apply temporal restrictions to the operation of the at least one device.

The further user defined rule set may be configured to allow the at least one device to ignore the plant control signal if a predetermined condition is satisfied, and wherein the predetermined condition is set by a fourth user input.

The predetermined condition may comprise a temporal condition.

The predetermined condition may comprise a particular time period of a day such that the at least one device automatically ignores the plant control signal during such particular time period.

For example, if the at least one device is a relay within a water pump which supplies water to the plant, the further user defined rule set may be set to allow the relay to ignore a plant control signal which indicates that the plant is water deficit during midday. This is because watering plants in full sun is not water efficient. Therefore, by allowing the at least one device to ignore the plant control signal during a time period of a day, it is possible to reduce wastage of resources.

The further user defined rule set may be configured to allow the at least one device to ignore the plant control signal for a first length of time immediately after the at least one device is switched off. The first length of time may be set by a fifth user input.

That is, after the at least one device is switched off (either manually or automatically by the plant control signal), the at least one device must wait for the first length of time before it can respond to the plant control signal again. This may be useful in that it prevents the at least one device from being switched on again, due to, for example, a signal glitch in the plant control signal, thereby avoiding wastage of resources.

The further user defined rule set may be configured to define a maximum length of time for which the at least one device can operate in an ON state. The maximum length of time may be set by a sixth user input.

That is, the at least one device will be switched off automatically after operating for the maximum length of time, regardless of the plant control signal. This may be useful in that it provides time for the plant to respond to the operation of the at least one device, and avoids an overcorrection to the stressor present in the plant or the growth medium of the plant. It also protects the at least one device from overworking.

The at least one device may comprise a first device and a second device which is separate from the first device. Applying a further user defined rule set to the at least one device may comprise applying a first instance of the further user defined rule set to the first device, and applying a second instance of the further user defined rule set to the second device, wherein the first instance and the second instance are separately defined by a user. The first device may be configured to change the growth environment of the plant based upon the plant control signal and the first instance of the further user defined rule set. The second device may be configured to change the growth environment of the plant based upon the plant control signal and the second instance of the further user defined rule set.

That is, different devices may be configured by a user to apply different, local, rule sets to the same plant control signal, thereby changing the growth environment of the plant in different manners. Accordingly, the user is able to more flexibly and more effectively control the growth environment of the plant.

It would be appreciated that the first instance and the second instance of the further user defined rule set may take different formats, contain different user defined rules, and/or receive separate user inputs.

The first device and the second device may be configured to control different aspects of the growth environment of the plant.

According to a second aspect of the present disclosure, there is provided a computer readable storage medium carrying computer readable instructions arranged to cause a computer to carry out a method according to the first aspect.

According to a third aspect of the present disclosure, there is provided an apparatus for controlling a growth environment of a plant, the apparatus comprising: a processor, and a computer readable storage medium carrying a computer program comprising computer readable instructions arranged to cause the processor to carry out a method according to the first aspect; and a display device, and wherein the processor is configured to generate a user interface on the display device, and the user interface is configured to receive user input for generating the user defined rule set.

The computer readable medium may further store the at least one machine learning model.

For example, the user interface may be configured to receive the first to the third user input described above for generating the user defined rule set.

The apparatus may further comprise a capture device configured to sense the electrical signal from the plant.

According to a fourth aspect of the present disclosure, there is provided a system for controlling a growth environment of a plant, the system comprising: an apparatus according to the third aspect, and at least one device which is configured to change the growth environment of the plant based upon the plant control signal.

The apparatus may be configured to apply a further user defined rule set to the at least one device. The at least one device may be configured to change the growth environment of the plant based upon the plant control signal and the further user defined rule set. The user interface may be configured to receive further user input for generating the further user defined rule set.

For example, the user interface may be configured to receive the fourth to sixth user input described above for generating the further user defined rule set.

The user interface may be configured to perform one or more of the following:

display an option, which, when selected by a user, allows the user to manually control the at least one device irrespective of the plant control signal; and display a zone map, which comprises an identity of the apparatus, an identity of the at least one device, and operating parameters of the at least one device.

According to a fifth aspect of the present disclosure, there is provided a method of controlling a growth environment of a plant, the method comprising: obtaining an electrical signal from the plant; generating, using at least one machine learning model, prediction data based upon the electrical signal, wherein the at least one machine learning model has been trained to assess at least one characteristic of the plant, and wherein the prediction data are based upon output(s) of the at least one machine learning model and indicate an assessment of the at least one characteristic of the plant; generating a plant control signal based upon the prediction data; and applying a user defined rule set to at least one device, wherein the at least one device is configured to change the growth environment of the plant based upon the plant control signal and the user defined rule set.

All of the features relating to the "further user defined rule set" described above in relation to the first to fourth aspect apply equally to the "user defined rule set" of the fifth aspect.

Where appropriate any of the optional features described above in relation to one of the aspects described herein may be applied to another one of the aspects described herein.

The terms "first" to "sixth" used to describe the user input are merely labels to allow clear references to the user input, and in no way imply temporal limitations to the order in which they occur.

Embodiments are now described, by way of example only, with reference to the accompanying drawings, in which:

FIG. 1 schematically illustrates a plant health monitoring device and a relay controller in use with a plant;

In the figures, like parts are denoted by like reference numerals. It will be appreciated that the drawings are for illustration purposes only and are not drawn to scale.

Figure 1:
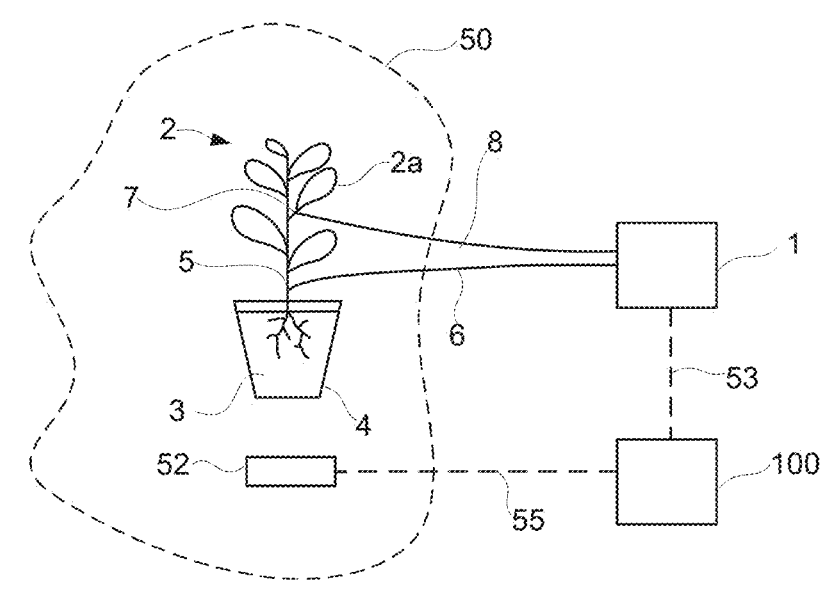

As shown in FIG. 1, a plant health monitoring device 1 is arranged to obtain electrical signals from a plant 2 and to monitor the health of the plant 2 based upon the electrical signal. The plant 2 is grown in a growth medium 3 which is contained within a container 4. The growth medium 3 may be any suitable medium in which the plant 2 is able to grow. For example, the medium 3 may be soil, compost, water or the like. The growth medium 3 may also be referred to as a "substrate".

A reference electrode 5 is attached to or inserted into a stem of the plant 2, and is connected, by a lead 6, to the plant health monitoring device 1. A capture electrode 7 is attached to a petiole of a leaf 2a of the plant 2, and is connected, by a second lead 8, to the plant health monitoring device 1. Alternatively, the reference electrode 5 may be inserted into, or otherwise attached to, a portion of root of the plant 2, or into the growth medium 3. Attaching the reference electrode 5 to the stem/root of the plant 2 allows signal uncertainties coming from the medium 3 to be removed. For example, it has been found that variations in the moisture level of the medium 3 result in variations in the electrical signal sensed at the reference electrode 5. Therefore, it is more preferable to attach the reference electrode 5 to the stem/root of the plant 2 than to insert it into the medium 3.

In an example where both the reference electrode 5 and the capture electrode 7 are attached to the plant 2, it is preferable to attached the reference electrode 5 to a part of the plant 2 which is closer to the growth medium, and to attach the capture electrode 7 to another part of the plant 2 which is further away from the growth medium.

It will be appreciated that the capture electrode 7 may comprise a plurality of capture electrodes which can be attached to a plurality of plants 2 or multiple different parts of a single plant 2. Similarly, the reference electrode 5 may comprise one or more reference electrodes. In an exemplary set-up, the plant health monitoring device 1 is connected to a plurality of reference electrodes 5 and a plurality of capture electrodes 7, and may be able to obtain electrical signals from more than one plant or from different parts of the same plant, at the same time.

FIG. 1 further shows that the plant 2 is within a growth environment 50. The growth environment 50 may be a growing chamber, a greenhouse or field. A device 52 is configured to change the growth environment 50. In an example, the device 52 comprises one or more relays, which are configured to control a heater, a fan or a vent provided within the growth environment 50, a lighting device which illuminates the plant 2, a water pump which irrigates the plant 2, a pump which deliver a chemical substance (e.g., salt) to the growth medium 3, a pump which applies fungicide or insecticide to the plant 2, a device which controls the humidity within the environment 50, and/or a device which delivers nutrition to the plant 2. Further or alternatively, the device 52 may comprise one or more smart devices, such as, a smart heater, a smart fan, a smart lighting device, a smart pump etc.

As described in more detail below, the plant health monitoring device 1 predicts at least one characteristic of the plant 2 based upon the electrical signal obtained from the plant 2 using at least one machine learning (ML) model, and, generates a plant control signal by applying a user defined rule set to prediction data which has been generated by the at least one ML model. The user defined rule set allows the user to customise the processing performed on the output(s) of the at least one ML model. The plant control signal is used to automatically control the growth environment 50. In particular, the plant health monitoring device transmits the plant control signal to the device 52 via a controller 100. The plant control signal automatically changes an operation of the device 52 without human intervention so as to change the growth environment 50 of the plant 2. By changing the operation of the device 52, it would be appreciated that an operational mode, a throughput and/or an output power of the device 52 may be increased or decreased, or the device 52 may be switched on or off. In the event that the device 52 is a relay, the plant control signal simply switches on or off the device 52.

The controller 100 is in communication with the plant health monitoring device 1 via a communication link 53, and is in communication with the device 52 via a communication link 55. The communication links 53 and 55 may be wired or wireless (e.g., internet, Bluetooth etc.). In a preferred embodiment, the communication links 53 and 55 are wireless, and the plant health monitoring device 1, the controller 100 and the device 52 are within the same wireless communication network (e.g., a wireless local area network (WLAN)). The controller 100 interprets the plant control signal sent from the plant health monitoring device 1 and determines what information is contained in the plant control signal. As described below in more detail, the controller 100 allows a user to input a further user defined rule set, which is used to apply customised, local, rules (or restrictions) to the operation of the device 52. Therefore, the controller 100 may generate a device control signal, based upon the plant control signal and the further user defined rule set, to control the operation of the device 52. The device control signal is transmitted to the device 52 via the communication link 55. As such, the operation of the device 52 is controlled by both the plant control signal generated by the plant health monitoring device and the further user defined rule set defined at the controller 100. In an example where the device 52 is a relay, the controller 100 may also be referred to as a relay controller.

Figure 2:
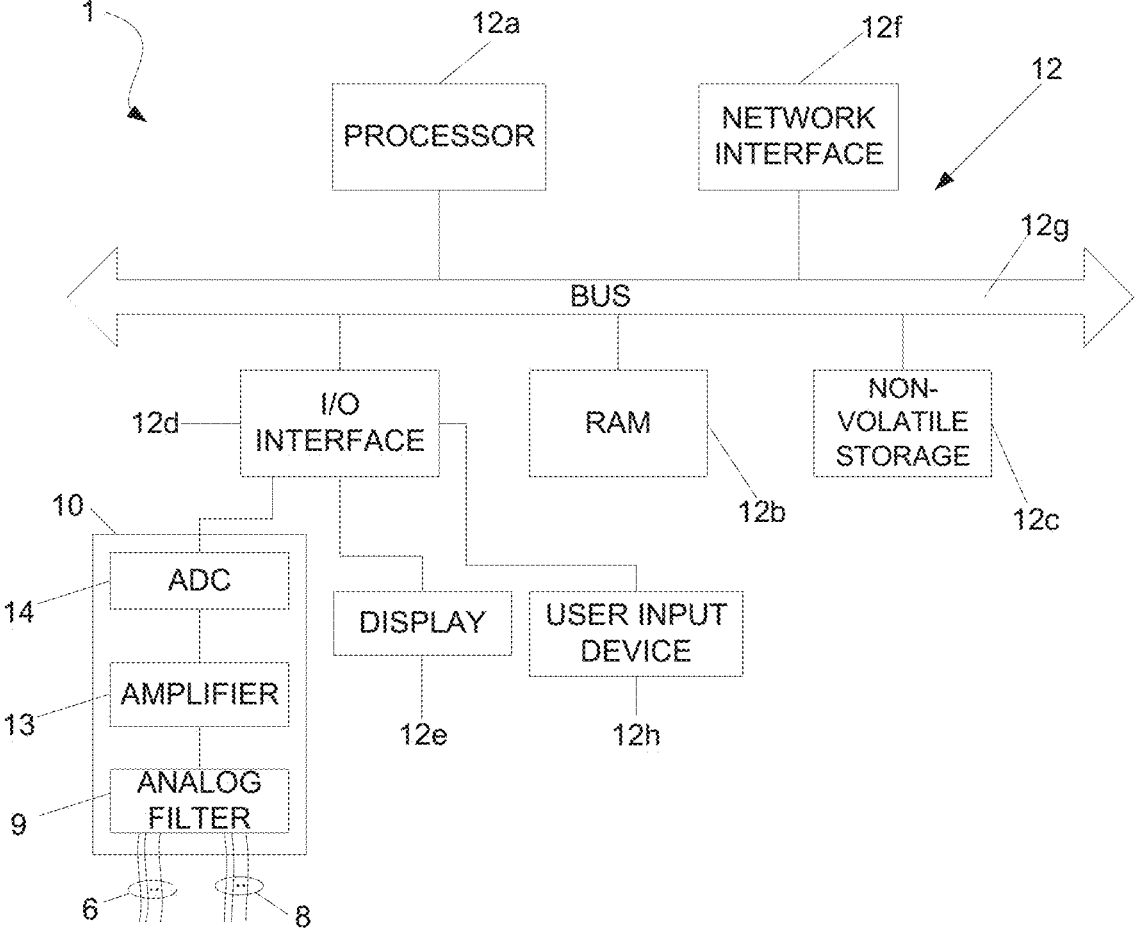
FIG. 2 is a schematic illustration of exemplary components that may be provided by the plant health monitoring device shown in FIG. 1.

The plant health monitoring device 1 allows either short-term or long-term monitoring of electrical signals obtained from plants. The exemplary components of the plant health monitoring device 1 are illustrated by FIG. 2. As shown in FIG. 2, the plant health monitoring device 1 comprises a data acquisition module 10 and a controller 12. The leads 6, 8 are connected to inputs of the data acquisition module 10. The data acquisition module 10 measures voltage potential differences present between each pair of the electrodes 5, 7 in the plant 2. Electrical signals may be recorded in mV level as a function of time and may be recorded at a rate of 240 Hz (i.e., 240 samples per second) by the data acquisition module 10. The recording frequency of the data acquisition module 10 may, for example, be any value between 1 Hz to 10 KHz.

In more detail, the data acquisition module 10 comprises an analog filter 9, an amplifier 13, and an analog-to-digital converter (ADC) 14. The analog filter 9 may be a low-pass filter. In an example, the analog filter 9 may be a DC-30 Hz filter with a gentle 6 dB/octave roll off. Such a filter is useful for minimal ringing so that the transient waveforms have minimal distortion in the time domain. The amplifier 13 may be an analog, non-switching, instrumentation amplifier and may provide an amplification factor between 0 and 100. In an example, the amplifier 13 provides an amplification factor of 4.

The ADC 14 may be of a Successive Approximation Register (SAR) design. In an example, the ADC 14 may be an 18-bit SAR ADC capable of processing 100K samples per second. In particular, the ADC 14 has a sample-and-hold input and may return a full 18-bit signed value over a +/–2.048V range for each input. The ADC 14 may be implemented using ADS8777 ADC made by Texas Instruments.

The controller 12 comprises a processor 12a which is configured to read and execute instructions stored in a volatile memory 12b which takes the form of a random access memory. The volatile memory 12b stores instructions for execution by the processor 12a and data used by those instructions. For example, in use, the data acquired by the data acquisition module 10 may be stored in the volatile memory 12b.

The controller 12 further comprises non-volatile storage 12c which may be in the form of a hard disc drive or a solid state drive. The data acquired by the data acquisition module 10 may be stored on the non-volatile storage 12c. The controller 12 further comprises an I/O interface 12d to which are connected data capture and peripheral devices (e.g., display, input device, etc.) used in connection with the controller 12. As shown in FIG. 2, the output of the data acquisition module 10 is connected to the I/O interface 12d. By virtue of these connections, potential differences sensed at the electrodes 5, 7 can be processed and converted to a digital signal by the data acquisition module 10 and subsequently processed by the processor 12a and stored in the non-volatile storage 12c. A display 12e is also connected to the I/O interface 102d. The display 12e displays a user interface which allows a user to input user defined rule set(s). This is described in more detail below. The display 12e may be provided locally to the plant health monitoring device 1 (e.g. as a screen), or remotely from the plant health monitoring device 1. For example, a display associated with a separate device (e.g. a mobile computing device or a desktop monitor) may be used as a display for the plant health monitoring device 1. A user input device 12h is also connected to the I/O interface 12d. The user input device may be a mouse and/or a keyboard. Alternatively or additionally, a touchscreen may be associated with the display 12e to operate as the user input device 12h. A network interface 12f allows the controller 12 to be connected to an appropriate computer network so as to receive and transmit data from and to other computing devices. The processor 12a, volatile memory 12b, non-volatile storage 12c, I/O interface 12d, and network interface 12f, are connected together by a bus 12g.

The controller 12 may be connected to an external computer/server via the network interface 12f. In that case, the external computer/service may further process the digitalised signals obtained by the controller 12. In an example, the digitalised signals may be extracted and processed using a data processing software by the external computer/server. Further or alternatively, the controller 12 may be connected to a single board computer via the network interface 12f, such that the digitalised signals obtained by the controller are collected into the single board computer.

In general, due to natural and man-made terrestrial electromagnetic noise as well as the low-voltage level of the potential variations produced by the plant 2, a Faraday cage is typically used to surround the plant 2, the leads 6, 8 and the plant health monitoring device 1 when electrical signals are obtained from the plant 2. The Faraday cage acts to shield the plant 2, the leads 6, 8 and the plant health monitoring device 1 from external sources of electromagnetic radiation.

In order to allow for operating the plant health monitoring device 1 outside of a Faraday cage, one or more of the following design implementations may be made to the plant health monitoring device 1.

Electrostatic discharge (ESD) protection circuits may be provided to the inputs of the data acquisition module 10. The pre-ADC analog filter 9 may be designed for minimal overshoot and ringing so that the transient waveforms have minimal distortion in the time domain. As described above, in an example, the analog filter may be a DC-30 Hz filter with a gentle 6 dB/octave roll off. An ultra-low input bias current instrumentation amplifier may be selected for use as the amplifier 13. The analog filter 9, the amplifier 13, and the ADC 14 may be typically implemented on a printed circuit board (PCB). In that case, the PCB may be designed such that it includes multiple (e.g., at least two) ground planes connected to one another by a plurality of vias, thereby ensuring short electrical ground current return paths. Further, the ADC 14 may be designed such that the analog input signal to the ADC 14 is oversampled (i.e., sampled at a sampling rate significantly higher than the Nyquist rate), and the output signal of the ADC 14 is then processed through a digital filter and a decimator. Moreover, a digital notch filter, such as a 50 Hz/100 Hz or 60 Hz/120 Hz digital notch filter may be included to process the output signal of the ADC 14.

In addition to the above described design implementations to the plant health monitoring device 1, the leads 6, 8 may be coaxial cables which are arranged to connect each of the electrodes 5, 7 to the plant health monitoring device 1. The coaxial cables may be useful for shielding the leads 6, 8 from external sources of electromagnetic radiation.

For the ease of description, the coaxial cable connected to the reference electrode 5 is referred to as a "reference cable" and the coaxial cable connected to the capture electrode 7 is referred to as a "capture cable". A coaxial cable typically comprises an inner conductor surrounded by a tubular insulating layer, further surrounded by a tubular outer conducting shield. The inner conductors of the coaxial cables act as the leads 6, 8 and are used to transfer signals sensed by the electrodes 5, 7 to the plant health monitoring device 1. The outer conducting shields of the coaxial cables act as the EM shield 9 to shield electromagnetic interference on the signals sensed by the electrodes 5, 7.

The coaxial cable has a capacitance between its inner conductor and its outer conducting shield. The capacitance of the coaxial cable may distort the signals sensed by the electrodes 5, 7. Thus, to compensate for the capacitance of the capture coaxial cable, a compensation circuit may be provided with the capture cable.

In more detail, the capture coaxial cable may be electrically connected to the capture electrode 7 via its inner conductor alone. The inner conductor of the capture cable provides an electrical signal sensed by the capture electrode 7 to the plant health monitoring device 1. The compensation circuit includes a buffer circuit with an amplification factor of '1' for the capture cable. The buffer circuit receives a voltage signal from the inner conductor of the capture cable and outputs a voltage signal to drive the outer conducting shield of the same cable. In this way, the voltage difference between the inner conductor and the outer conducting shield of the capture coaxial cable is maintained at substantially 0 Volt by the buffer circuit. Accordingly, the capacitance of the capture cable does not charge or discharge based upon signal level fluctuations, and the distortion caused by the capacitance of the capture cable to the signals sensed by the electrodes 5, 7 may be reduced to a negligible level. The buffer circuit may, for example, take the form of a voltage follower. The voltage follower may be an op-amp circuit which has a negative feedback and a voltage gain of '1'.

The reference cable may be electrically connected to the reference electrode 5 via both of its inner conductor and outer conducting shield. That is, the inner core and the outer conducting shield of the reference cable may be electrically coupled together with a voltage difference of substantially 0 Volt. The outer conducting shield is driven with a voltage of 0 Volt (i.e. ground), to provide a low impedance path for channeling any interference to the ground. The inner conductor of the reference cable, which is also at a voltage of substantially 0 Volt, provides an electrical signal to the plant health monitoring device 1. In this configuration, the reference cable does not require a compensation circuit to compensate for the capacitance of the cable.

Alternatively, the reference cable may be connected to the reference electrode 5 via its inner conductor alone, and accordingly may have its own compensation circuit as described above with reference to the capture cable. In either of these two configurations for the reference cable, the voltage difference between the inner core and the outer conducting shield of the reference cable is substantially zero. Accordingly, the capacitance of the reference cable does charge or discharge during signal acquisition, so its effect to the electrical signal sensed by the electrodes 5, 7 may be considered to be insignificant. Thus, transient distortions of the electrical signals obtained from the reference electrode 5 as a result of cable capacitance may be considered to be insignificant.

Figure 3:
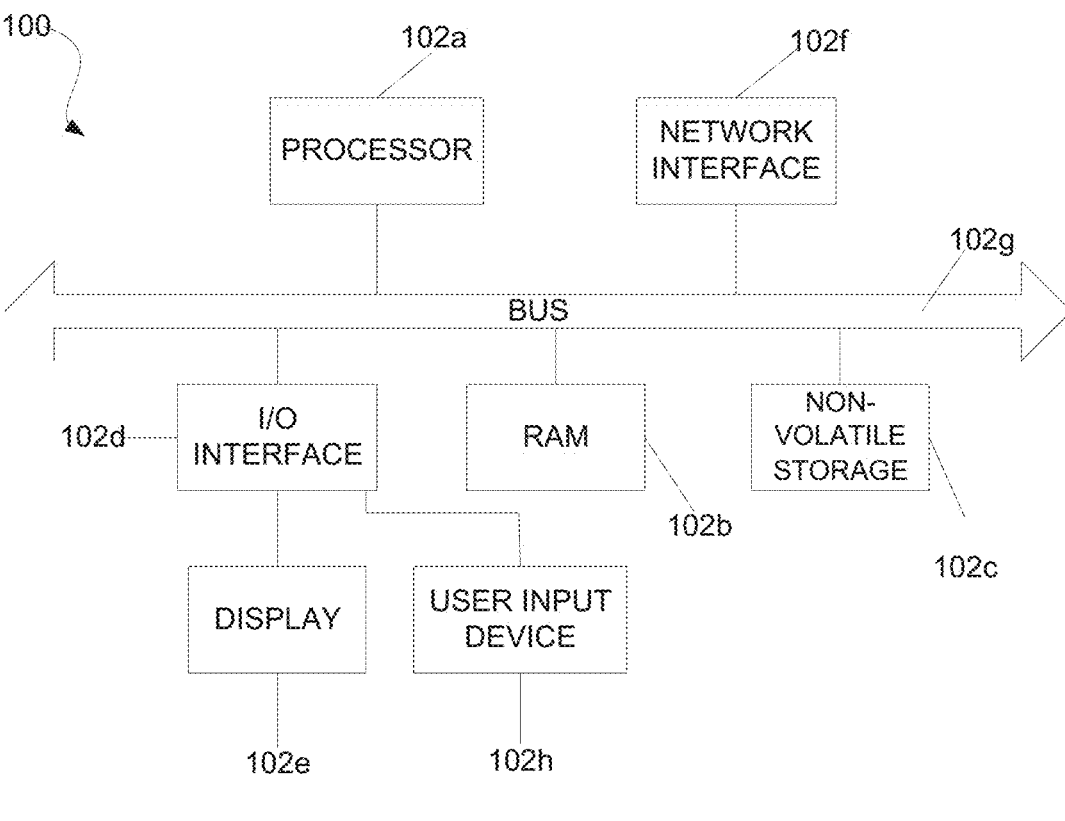
FIG. 3 is a schematic illustration of exemplary components that may be provided by the relay controller shown in FIG. 1.

FIG. 3 illustrates schematically the exemplary components of the controller 100. As shown in FIG. 3, the controller 100 comprises a processor 102a, a volatile memory 102b, a non-volatile storage 102c, an I/O interface 102da, a display 102e, a user input device 102h, a network interface 102f and a bus 102g. These components of the controller 100 are similar to the processor 12a, the volatile memory 12b, the non-volatile storage 12c, the I/O interface 12da, the display 12e, the user input device 12h, the network interface 12f and the bus 12g of the controller 12 of the plant health monitoring device 1, respectively.

While in the example of FIG. 1, the plant health monitoring device 1 and the controller 100 are shown as two separate devices, it would be appreciated that they may be provided by different functional modules of a single device.

Figure 4:
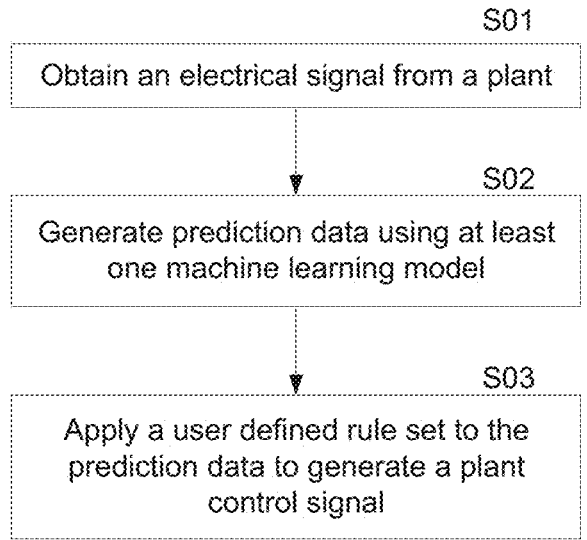
FIG. 4 is a flowchart showing processing steps carried out by the plant health monitoring device to generate a plant control signal based upon an electrical signal obtained from a plant.

FIG. 4 shows processing steps for generating a plant control signal. The processing steps may be carried out by the plant health monitoring device 1, and/or an external computer/server which is connected to the plant health monitoring device 1 via the network interface 12f.

At Step S01, an electrical signal is obtained from the plant 2. In this step, the raw data of the electrical signal received from the plant 2 may be processed to reduce the data dimensionality and to extract meaningful information from the electrical signal. In particular, data samples which match the nature of the input variables of at least one machine learning (ML) model (referred to at step S02) may be generated from the raw data of the electrical signal. The raw data may be obtained by the electrodes 5, 7 and the leads 6, 8 as described above.

Figure 5:
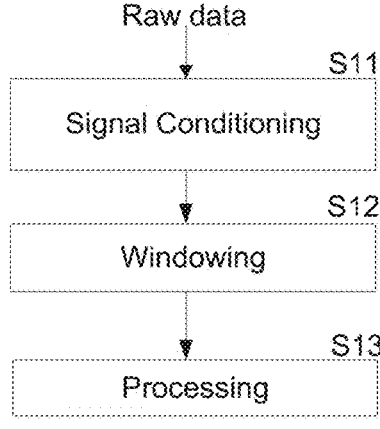
FIG. 5 is a flowchart showing processing steps carried out by the plant health monitoring device to process the electrical signal obtained from the plant before the application of a machine learning technique.

Exemplary sub-processing steps of step S01 are shown in FIG. 5, and include three phases, signal conditioning (step S11), windowing (step S12) and extracting features (step S13). Steps S11 to S13 may be carried out by the plant health monitoring device 1, and/or an external computer/server which is connected to the plant health monitoring device 1 via the network interface 12f. Alternatively, the raw data may be stored in the plant health monitoring device 1 for subsequent processing by any suitable device(s).

At Step S11, signal conditioning is performed on the raw data of the electrical signal obtained from the plant 2. Various types of signal conditioning may be used (both in the analogue and digital domains) to remove any unwanted signal components, or to enhance other signal components as required. In particular, the signal conditioning may comprise one or more of: amplifying, filtering, normalising, and/or down-sampling the electrical signal. It will be appreciated that the signal conditioning may be partly performed by the hardware provided in the data acquisition model 10 of the plant health monitoring device 1, and/or suitable device(s) external to the plant health monitoring device 1. For instance, the analog filter 9 of the data acquisition model 10 performs signal conditioning in the analogue domain to remove unwanted frequency components, and the amplifier 13 of the data acquisition model 10 performs signal conditioning in the analogue domain by amplifying the sensed electrical signal to a level which is suitable for digitisation. Further, as described above, a digital filter and a decimator may be provided to perform signal conditioning on the digitised signal output by the ADC 14, by performing digital filtering and decimation (i.e., down-sampling). The digital filter may be a digital notch filter, such as a 50 Hz/100 Hz or 60 Hz/120 Hz digital notch filter. Moreover, the electrical signal obtained from various plants or various parts of the same plant may be normalised at step S11. It will be appreciated, however, that the use of any particular signal conditioning device is optional. Alternatively signal artefacts contained within the raw data may be removed manually or automatically. After step S11, conditioned data is obtained.

At step S12, the conditioned data are sampled. In an example, data samples are taken from the conditioned data periodically (e.g., at a rate of one sample per every 5 minutes). Each data sample may include at least one data segment obtained by applying a window function to the conditioned data. The window function has non-zero values within a chosen time interval and is zero-valued outside of the chosen time interval. Thus, by multiplying the window function and the conditioned data, a data segment in the time domain is obtained.

In an example, the data segments included within consecutive data samples may be partially overlapping in time. This may be achieved by allowing the window size of the window function to be longer than the time gap between consecutive data samples. For example, if data samples are taken at a rate of one sample per every 2 minutes, the time gap between consecutive data samples is 2 minutes but the window size of the window function may be 10 minutes, and as such, consecutive data samples may have 80% of the data overlapped.

At step S13, data processing is performed on each data sample obtained at step S12 to transform the data samples into processed data which can be provided as input data to at least one ML model. It will be appreciated that the particular form of the data processing carried out at step S13 depend upon the input variables of the at least one ML model at step S02. That is, data samples obtained at step S12 are processed at step S13 to generate data which matches the types of the input variables of the at least one ML model.

Two examples of the data processing are provided below.

In an example, at step S13, each data sample obtained at step S12 is processed to extract characterising features of the data segment contained within the data sample. The extracted characterising features may be provided as input data to the at least one ML model.

For instance, 26 characterising features are extracted from each data segment. The 26 features may include: simple statistical features (i.e., min, max, mean, variance, skewness, kurtosis and interquartile range), Hjorth parameters (i.e., mobility and complexity), generalized Hurst exponent, wavelet entropy (i.e., Shannon and logarithmic) and the estimation of the power of each color of noise (i.e., white, pink, brown, blue and purple) contained in the respective data segment. Further, wavelet decomposition may be performed on each data segment to more than one level, and simple statistical features (min, max, average) of the coefficients extracted at at least one level of the wavelet decomposition may be calculated. In an example, data processing software (e.g., Matlab) may be employed to perform wavelet decomposition to eight levels on each data segment, and the coefficients at three of the eight levels, e.g., level-1 (high frequencies), level-4 (medium frequencies) and level-8 (low frequencies), may be extracted. The min, max and average values of the coefficients (e.g., the approximation and/or the detail coefficients) extracted at each of the three levels are then calculated, thereby resulting in 9 characterising features in total. The wavelet decomposition is a multi-level discrete wavelet transform and may be implemented using the "wavedec" function in Matlab software. Performing wavelet decomposition to multiple levels generally requires multiple levels of wavelet analyses.

In an alternative example, at step S13, each data sample is processed to obtain spectrogram data of the data segment included within the data sample. The spectrogram data may be provided as input data to the at least one ML model. As described above, the data segment included within the data samples obtained at step S12 are in the time domain. The spectrogram data are in the frequency domain, and indicate the amplitudes of the frequency components contained within the data segment(s). Fourier transforms may be used to generate the spectrogram data from the data samples.

Turning back to FIG. 4, at Step S02, prediction data are generated based upon the electrical signal obtained at step S01, using at least one ML model. The at least one ML model may have been downloaded to the non-volatile storage 12*c* of the plant health monitoring device 1, from a remote server via the network interface 12*f*. The at least one ML model may comprise a regression model and/or a classification model.

The at least one ML model has been trained to assess at least one characteristic of a plant based upon an electrical signal obtained from the plant. In an example, the at least one ML model may have been trained to access whether a stressor is present in the plant 2 or in the growth environment 50 of the plant 2. The stressor may be any factor which causes a change to the growth environment or the physiology of a plant. The stressor typically causes the plant to have a corresponding characteristic (e.g., light deficit/excess, water deficit/excess, nutrition deficit/excess, slow/fast metabolism, temperature deficit/excess, $CO_2$ deficit/excess, salt deficit/stress, insect infestation (such as, aphid attack), pathogen presence where a pathogen may be a virus, fungus or bacteria, premature or delayed growth, flowering or fruit maturing etc.) associated with the nature of the stressor.

Therefore, plant characteristics are associated with the presence/absence of any stressor(s). One example of training the ML model is described in the applicant's GB patent application 1903652.4, U.S. patent application Ser. No. 16/821, 213 and European patent application 20195796.6 which are incorporated herein by reference, and the relevant description has been reproduced below with reference to FIG. 9.

The electrical signal obtained from the plant 2 at step S01 provides input data to the at least one ML model. In an example, the extracted characterising features of the data samples of the electrical signal, which were obtained at step S13, are fed to the at least one ML model as input data. In another example, the spectrogram data of the data samples of the electrical signal, which were obtained at step S13, are fed to the at least one ML model as input data. The at least one ML model, in turn, generates output data indicative of an assessment of at least one characteristic of the plant. The output data of the at least one ML model may be regarded as the "prediction data" which indicates an assessment of the at least one characteristic of the plant. Additionally, the output data of the ML model may be further processed to generate the "prediction data". The prediction data may comprise a plurality of prediction data items, each of which is generated (based upon an output of the ML model) per each data sample obtained from the electrical signal at step S12. Therefore, in the event that data samples are taken from the electrical signals periodically, the ML model generates a series of corresponding prediction data items at different times.

At Step S03, a user defined rule set is applied to the prediction data to generate a plant control signal.

Figure 6:
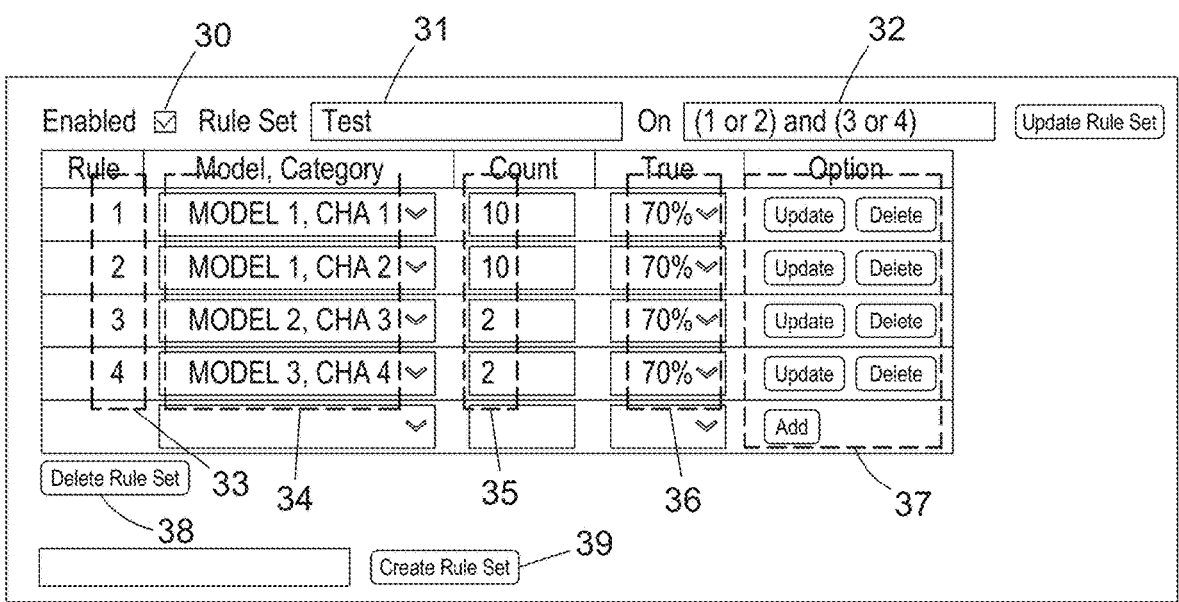
FIG. 6 illustrates a user interface of the plant health monitoring device which allows a user to input a user-defined rule set.

An example of the user defined rule set is described below with reference to FIG. 6. FIG. 6 shows a user interface displayed at the display 12*e* of the plant health monitoring device 1. The user interface allows a user to input a user defined rule set via the user input device 12*h* of the controller 12.

As shown in FIG. 6, the user has created a rule set called "Test" (as shown in entry 31). The rule set "Test" includes 4 rules which are labelled as '1', '2', '3', '4' in column 33 of the interface. In Rule '1', the user has selected 'MODEL 1, CHA 1' via the pull-down menu under the header "Model, Category" as shown in column 34. By selecting 'MODEL 1, CHA 1', the user has selected a particular characteristic called 'CHA 1' of a particular ML model 'MODEL 1'. The characteristic 'CHA 1' may correspond to a plant characteristic to be assessed by the model 'MODEL 1'. The user has further entered a value '10' under the header "Count" in column 35, and has selected a value '70%' under the header "True" in column 36. 'MODEL 1 is an example of a machine learning model which has been trained to assess more than one characteristic of a plant. Therefore, by selecting the characteristic 'CHA 1' of the model, the user has selected a corresponding plant characteristic to be assessed by the ML 'MODEL 1'. The output of the model 'MODEL 1' with the selected characteristic 'CHA 1' is an example of the "prediction data" which indicates an assessment of the at least one characteristic of the plant.

In an example, the model 'MODEL 1' is a classifier, and the output of the classifier may also be referred to as a classification probability value which is in the range of 0.00 to 1.00. For instance, a classification probability value of 1.00 may indicate that a stressor is present in the plant 2 or in the growth environment 50 of the plant 2, while a classification probability value of 0.00 may indicate that a stressor is not present. For a well-trained classifier, the output classification probability values are 0 or 1 or very close to 0 or 1. The 'Count' parameter is the number of classification probability values to use for averaging while the 'True' parameter is used to specify a threshold for the average, above which the Rule is considered to be met (i.e., the Rule is true). In the example of Rule '1', the entered 'Count' value of '10' means that every time a new classification matching the characteristic 'CHA 1' is made by the model 'MODEL 1', the output classification probability value will be added to the 9 previous classification probability values and then an average of the 10 classification probability values is calculated. The selected 'True' value of '70%' means that the average of the last 10 classification probability values needs to be equal to or higher than 70% in order for Rule '1' to be considered true. In other words, within Rule '1', the user has defined that a moving average of 10 consecutive outputs of the selected model 'MODEL 1' with the characteristic 'CHA 1' is calculated and that the calculated moving average is compared to a selected threshold value of 70% to determine whether Rule '1' is true or false.

As described above, consecutive data samples of the electrical signal (those obtained at step S12 of FIG. 5) which provide input data to the ML model may be partially overlapped. Each classification probability value output by the ML model is generated based upon a respective one of the data samples. With consecutive data samples being partially overlapped, it is expected that for a well-trained classifier, the generated classification probability values form clusters of 0 or 1, and that there is no repeated fluctuations within a particular cluster. The size of the cluster may be smaller than the user-entered 'Count' value, and accordingly a moving average of a subset of the model outputs may be smaller than 1. Therefore, the threshold value is selected between a range of 0% to 100%.

A moving average may also be referred to as "rolling average" or "running average". Given a series of numbers and a fixed subset size, the first element of the moving average is obtained by taking the average of the initial fixed subset of the number series. Then the subset is modified by "shifting forward"; that is, excluding the first number of the series and including the next value in the series. In the example of Rule '1', the user has set that the subset for calculating the moving average has 10 values, and is able to modify the size of the subset by changing the particular value entered under the header 'Count'. In general, a moving average is useful to smooth out short-term fluctuations and highlight longer-term trends. Short-term fluctuations in the output of an ML model may be caused by prediction errors of the model, or noise in the electrical signal obtained from the plant 2. Calculating the moving average of the output of the ML model is useful for dampening the short-term fluctuations in the output and for improving the accuracy of the prediction provided by the ML model.

By selecting a larger value under the header 'Count' (i.e., setting a larger subset for calculating the moving average), the moving average tends to highlight longer-term trends. By allowing a user to set the size of the subset, the user is able to more efficiently process the output of the ML model based upon the nature of the characteristic of the plant assessed by the ML model. For example, if 'MODEL 1, CHA 1' assesses the presence/absence of a stressor (e.g., light deficit) which causes the plant to respond very quickly, the size of the subset may be set by the user to be a relatively small value; if 'MODEL 1, CHA 1' assesses the presence/ absence of a stressor (e.g., pathogen presence) which causes the plant to respond in a much slower speed, the size of the subset may be set by the user to be a large value.

If the user is not interested in calculating the average of the output values of the model 'MODEL 1' with the characteristic 'CHA 1' but would like to obtain the output values in their original form, the user may simply enter a value '1' under the header "Count" in column 35.

Rules '2', '3' and '4' of the exemplary Rule set "Test" are similar to Rule '1' described above. The user can update or delete each of Rules '1' to '4' and can add new rule(s) by selecting the options provided in column 37 of the user interface. As an example, in Rule '2', the user has selected a particular characteristic 'CHA 2' of the model'MODEL 1' via the pull-down menu 34. 'MODEL 1, CHA 2' and 'MODEL 1, CHA 1' used in Rule'1' refer to the same ML model 'MODEL 1' which has been trained to access at least two characteristics (which correspond to 'CHA 1', and 'CHA 2') of a plant. In Rule '3', a characteristic 'CHA 3' of a model called 'MODEL 2' has been selected. This model is different from the model selected in Rule '1' and Rule'2'.

Each of the rules included within the rule set "Test" can be set by the user independently of other rules. By selecting a suitable ML model and a characteristic of the model at column 34 of the user interface, each rule outputs a value indicative of an assessment of a corresponding characteristic of the plant 2.

The user interface further allows a user to enter a logical calculation for the rule set at entry 32 of the user interface. The logical calculation may reference some or all of the rules included within the rule set.

In FIG. 6, the user entered a logical argument "(1 or 2) and (3 or 4)" at entry 32. In this example, "and" and "or" are natural language logical connectives; "1 or 2" means that if Rule '1' is True or Rule '2' is True then the result of "1 or 2" is True; "(1 or 2) and (3 or 4)" means that only if the result of "1 or 2" and the result of "3 or 4" are both True, then the rule set "Test" is True. "(1 or 2) and (3 or 4)" uses parentheses to prevent the argument from being interpreted incorrectly. The rule set "Test" being True normally indicates that a condition exists in the plant 2 or the growth environment 50 and requires intervention (such as, turning the device 52 on). A rule set must be enabled (by ticking the box 30) for it to be used. A more complex rule set can be constructed by adding additional rules and referencing them at entry 32 of the user interface.

Others natural language logical connectives may be used to define the rule set at entry 32 of the user interface. Examples include "then", "FthenT", "TthenF", "NOT" etc. In an example, "1 then 2" means if Rule '1' is True then Rule '2' changes from False to True then the rule set is True; "FthenT" means 'following a rule changes from False to True'; "TthenF" means 'following a rule changes from True to False'; and "NOT" means the logical opposite of a rule. For more complicated rule set, parentheses may be useful to specify how to interpret the argument.

If a rule set includes a single rule—Rule '1', the user may simply reference the rule number '1' at entry 32 of the user interface. This means that if Rule '1' is True, the rule set is True.

The user may further select the option 38 to delete the entire rule set "Test", and create a new rule set by selecting the option 39 provided in the user interface.

It will be appreciated that the logical calculation at entry 32 of the interface may take any suitable form and is not limited to a logical argument with logical connectives. For example, the logical calculation may be '1+2>1.5', which means that if the sum of the result of Rule '1' and the result of Rule '2' is larger than 1.5, then the rule set "Test" is True. The logical calculation allows a user to define the result of a rule set based upon the results of the rules included within that rule set with great freedom.

In the example shown in FIG. 6, the user-entered value under the header "Count" in column 35, the user-selected value under the header "True" in column 36, and the logical calculation entered by the user at entry 32 collectively provide a "user defined rule set". The entered value under the header "Count" may be referred to as "a first user input". The selected value under the header "True" may be referred to as "a second user input". The logical calculation may also be referred to as "third user input".

As described above, different rules within a rule set may reference any available ML model of the user's choice, and accordingly may generate output indicative of assessments of different characteristics of the plant. The user may select suitable ML models to be referenced in the rules and determine the particular form of the logical calculation, based upon his/her knowledge of the plant. For example, the user may be aware that it is normal or ideal for a plant to be water deficit at cold temperature, and therefore it is not necessary to irrigate the plant at cold temperature. The user may design a rule set which controls an irrigation pump of the plant. The rule set may include Rule '1' references a first ML model which assesses whether the plant is water deficit and Rule '2' references a second ML model which assesses whether the plant is temperature deficit. The output of the first ML model may be regarded as the "first prediction data", and the output of the second ML model may be regarded as the "second prediction data". The user may further define the logic calculation to be "1 and (NOT 2)", which means that if result of Rule '1' is true (i.e., the plant is water deficit) but result of Rule '2' is false (i.e., the plant is NOT temperature deficit), the rule set is True and accordingly the irrigation pump is on. In this example, using two different ML models allows the user to obtain a fuller picture of the characteristics of the plant. By further allowing the user to design, via the logic calculation (which is a part of the user defined rule set), the processing performed on the outputs of the ML models, the user is able to more flexibly and more effectively control the growth environment of the plant.

By applying a user defined rule set to the output(s) of the ML model(s), the user is able to customise the processing performed on the output(s) of the ML model(s) based upon the nature of the plant and the functions of the ML model(s) in order to generate a plant control signal for optimising the growth environment of the plant. This is in contrast to the prior method of directly using the output of an ML model as a trigger to change the growth environment of the plant.

In the example provided by FIG. 6, the user defined rule set calculates a moving average of a subset of the output values of a ML model, and the size of the subset is defined by the user-entered value under the header "Count". The result of the calculated moving average may be referred to as a "prediction result" provided by the ML model. It will be appreciated that the user defined rule set may be modified such that a prediction result may be generated based upon any suitable combination of the output values of a ML model or a subset of the output values. Examples of the "combination" may include a sum, an average, a weighted sum, and/or a weighted average of the output values of a ML model or a subset of the output values.

Further in the example provided by FIG. 6, the ML model used by Rule '1' is a classifier. It will be appreciated that ML model may be any suitable ML model including a regression model and a classifier.

As described above and with further reference to FIG. 1, the resulting value of the logical calculation of the user defined rule set may be used to control the operation of the device 52 so as to change the growth environment 50, and therefore is an example of the "plant control signal". The plant health monitoring device 1 transmits the plant control signal to the controller 100 via the communication link 53.

In an example, the communication link 53 is wireless, and there are multiple controllers 100 in communication with the plant health monitoring device 1. The plant health monitoring device 1 may broadcast the plant control signal to the multiple controllers 100. By broadcasting the plant control signal, the recipient of the plant control signal is unspecified, and therefore all of the relevant controllers 100 in communication with the plant health monitoring device 1 can receive the plant control signal. This is in contrast to direct point-to-point signal transmission which specifies a particular device as a recipient, and is more efficient to communicate the plant control signal to multiple controllers 100.

The multiple controllers therefore receive the same plant control signal, and thus the plant control signal may be considered as a global signal for the controllers 100. Each controller 100 is able to interpret the plant control signal and to determine what information is contained in the plant control signal. The information contained within the plant control signal can be used by the controller 100 to control the operations of the device 52.

The controller 100 also allows a user to input a further user defined rule set, and applies the further user defined rule set to restrict the operation of the device 52. The further user defined rule set includes customised, local, rules applicable to the device 52. As such, the operation of the device 52 is controlled by both the plant control signal from the plant health monitoring device 1 and the further user defined rule set defined at the controller 100. When there are multiple devices 52 controlled by the same controller 100, the user may provide different instances of the further user defined rule set to different ones of the devices 52, such that different devices 52 are controlled by different local rules and respond in different manners to the same plant control signal. It would be appreciated that the different instances of the further user defined rule set may take different formats, contain different user defined rules, and/or receive separate user inputs.

Figure 7:
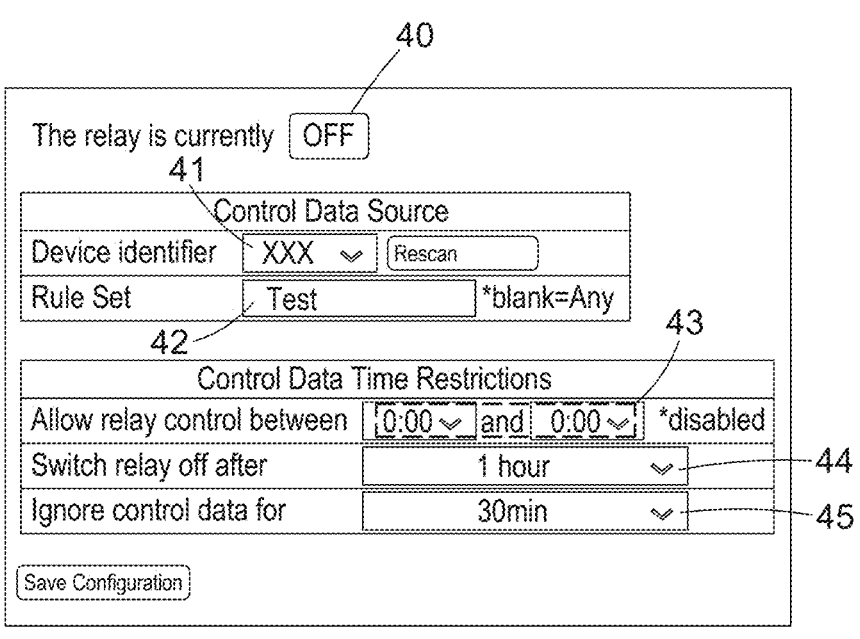
FIG. 7 illustrates a user interface of the relay controller which allows a user to input a further user-defined rule set.

An example of the further user defined rule set is described below with reference to FIG. 7. FIG. 7 shows a user interface displayed at the display 102e of the controller 100. The user interface allows a user to input the further user defined rule set for the device 52, via the user input device 102h of the controller 100. In this example, the device 52 is a relay which may control a heater, a fan, a vent, a lighting device, a pump or any other suitable devices within the growth environment 50.

As shown in FIG. 7, the current status of the relay is displayed at the box 40 of the user interface. The box 40 indicates the ON/OFF status of the relay, and is also a button that can be clicked to manually take control of the relay. Once manual relay control is established, the plant control signal is ignored until the user releases the manual override.

The user interface of FIG. 7 includes a section called "Control Data Source". The "Device identifier" shown in this section is the identifier of the plant health monitoring device 1 which provides the plant control signal. As such, the device 52 only responds to the plant control signal transmitted by a device with the same identifier. If the identifier doesn't appear in the pull-down menu 41, the user can click the 'Rescan' button next to the menu 41. The user interface may be designed such that there is no way to manually enter the identifier of the plant health monitoring device as this is a safety feature intended to ensure that the controller 100 and the plant health monitoring device 1 are attached to the same network and are able to communicate with each other (e.g., via the communication link 53). Entry box 42 allows a user to enter the name of the rule set that is used to generate the plant control signal. The name of the rule set is supposed to match the name of one of the rule sets defined in the user interface of the plant health monitoring device 1. If the entry box 42 is left blank, it means that any of the rule sets which is defined in the user interface of the plant health monitoring device 1 and is enabled to use will be accepted as a source of the plant control signal.

The user interface of FIG. 7 further includes a section called "Control Data Time Restrictions". The options available in this section allows the user to apply temporal restrictions to the operation of the relay (e.g., the device 52).

In particular, the first option allows the user to enter a particular time period of a day at pull down menus 43, such that the relay will respond to the plant control signal generated by the plant health monitoring device 1 during such a time period, but will automatically ignore the plant control signal outside of the time period. For example, if the device 52 is a relay within a water pump which irrigates the plant 2, and the user does not wish to water the plant 2 around midday (e.g., between 10:00 am to 3:00 pm) because it is not efficient, the user may enter a time period of 3:00 pm to 10:00 am using the pull down menus 43. As a result, the relay 52 will stay off and ignore the plant control signal from the plant health monitoring device 1 between 10:00 am and 3:00 pm.

The second option allows the user to select a first time length at a pull down menu 44, such that after staying on for the selected first time length, the relay will be automatically switched off regardless of the plant control signal. The first time length is therefore the maximum length of ON time of the relay. This may be useful in that it provides time for the plant to respond to the operation of the relay, and avoids an overcorrection to the stressor present in the plant 2 or the growth medium 50. It also protects the device controlled by the relay 52 from overworking.

The third option allows the user to select a second time length at a pull down menu 45, such that after the relay is switched off, it will ignore the plant control signal for the second time length before it responds to the plant control signal again. This may be useful in that it provides time for the plant to respond to the operation of the relay, and avoids overcompensating the stressor present in the plant 2 or the growth medium 50.

It may also prevent the relay from being switched on and off frequently, due to, for example, a signal glitch in the plant control signal, thereby avoiding wastage of resources.

The section "Control Data Time Restrictions" may provide a further option which allows a user to set pre-programmed on/off times for the device 52.

The options included within the "Control Data Time Restrictions" section collectively provide the further user defined rule set. The further user defined rule set allows a user to easily program the device 52, such that the device 52 responds to the plant control signal under the restrictions set out by the further user defined rule set. The further user defined rule set therefore provides additional flexibility for the user to control the plant 2 or its growth environment 50. When configuring the further user defined rule set, the user may take into account the characteristics of the plant 2, the purpose of the device 52, and the meaning of the plant control signal, so as to create an ideal growth environment for the plant while minimising any wastage of resources.

In the event that there are multiple devices 52 within the growth environment 50, the controller 100 may provide a user interface allowing the user to separately enter the further user defined rule set for each individual device 52, such that the devices 52 respond in different manners to the same plant control signal.

Figure 8:
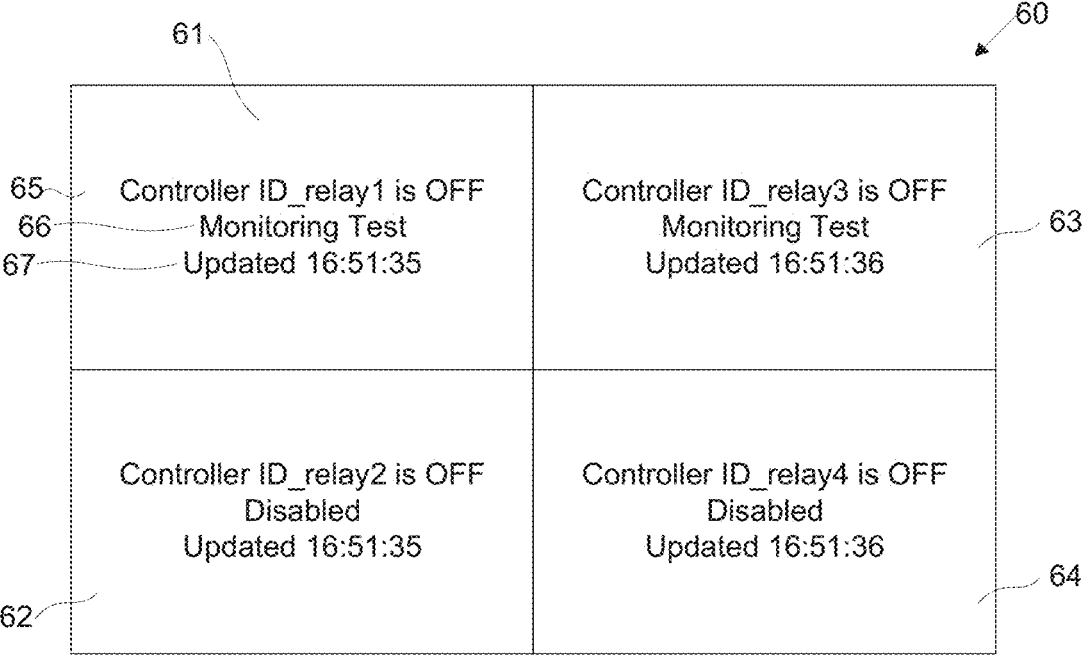
FIG. 8 illustrates a zone map displaying the status of relays controlled by the relay controller.

The user interface of the controller 100 may also include a zone map feature. An exemplary zone map 60 is illustrated in FIG. 8. The zone map 60 includes 4 zones 61, 62, 63 and 64 which correspond to 4 relays being controlled by the controller 100.

The following information is displayed for each zone: a button 65 displaying the Relay Controller's Device Identifier (i.e., the ID of the controller 100) followed by 'Relay' and the relay number, the state of the relay (ON or OFF), the rule set being monitored by the relay (this is displayed at the line 66. If the relay does not monitor any rule set, "Disabled" is displayed, and a timestamp 67 indicating when last communication took place between the relay and the controller 100. Once data is received by the relay from the controller 100, the Device Identifier may change from text to a button. Clicking the button may open the controller 100's web interface. The relay state may be updated immediately if it changes from OFF to ON or vice versa. It may also be updated automatically every 15 seconds. The zone map may also display a "Configure Zones" button which, when clicked, allows the user to configure the zones.

In the example provided above, the plant health monitoring device 1 uses the electrical signal obtained from a plant to generate a plant control signal, which controls the growth environment of the same plant. If the electrical signal obtained is erroneous (e.g., due to a faulty signal sensor), there is a risk that the growth environment of the plant may be incorrectly controlled. Therefore, in another embodiment of the present disclosure, the plant health monitoring device 1 may obtain electrical signals from at least two plants and generate prediction data using the at least one ML model based upon the electrical signal from each of the plants. More specifically, the prediction data may include prediction data for a first plant, and further prediction data for a second plant. The first plant and the second plant may be of the same type (or species). A user defined rule set may be applied to the prediction data and the further prediction data to generate the plant control signal, and the plant control signal is configured to change the growth environment of the first plant and the second plant. In particular, the user defined rule set may allow the user to selectively use one or both of the prediction data and the further prediction data to generate the plant control signal. If the electrical signal obtained from a particular plant is noisy or contains an error signal (e.g., due to a faulty sensor), the prediction data generated based upon that electrical signal would be abnormal and/or typically deviates from the prediction data generated for other plants. The user interface of the plant health monitoring device 1 may allow the user to inspect all of the prediction data. By way of using the user defined rule set, the user may be allowed to remove or disregard any abnormal prediction data or prediction data which deviate from other prediction data, before the plant control signal is generated. In this way, the plant control signal would not be substantially affected by a problematic electrical signal obtained from the particular plant, and the growth environment of the particular plant can still be correctly controlled. This provides the user with more flexibility in controlling the growth environment of the plants, and also improves the robustness of the controlling system. Of course, if none of the prediction data generated appears abnormal or erroneous, the user defined rule set may be applied to generate the plant control signal based upon a combination of the prediction data and the further prediction data. The term "combination" is intended to mean that both the prediction data and the further prediction data are taken into account in the generation of the plant control signal. Examples of the "combination" may include a sum, an average, a weighted sum, and/or a weighted average of the prediction data and the further prediction data. An example is provided below with reference to FIG. 15.

The example provided by FIG. 1 illustrates the use of a single plant health monitoring device 1 and a single device 52 within the growth environment 50 of the plant 2. However, it will be appreciated that in a growth environment of plants, there may be provided a plurality of plant health monitoring devices 1 which are loaded with various combinations of ML models and provided with different or the same user-defined rule sets. There may also be provided a plurality of the devices 52 which are configured to control different or the same aspects of the growth environment and/or to control different or the same groups of the plants within the growth environment. Each of the plant health monitoring devices 1 may broadcast a respective plant control signal. The controller(s) 100 may allow a user to program each of the devices 52, such that each device 52 is responsive to particular one(s) of the plant health monitoring devices 1, and particular user-defined rule sets enabled on those devices. This may be achieved by setting the "Control Data Source" section (as shown in FIG. 7) of the user interface for each of the devices 52. Further, the "Control Data Source" section of the user interface may be modified such that each device 52 is responsive to the plant control signals generated by more than one of the plant health monitoring devices 1. The user interface of FIG. 7 may further provide an option allowing a user to input a logic calculation (similar to that provided at entry 32 of FIG. 6). The logic calculation may reference the plant control signals generated by more than one of the plant health monitoring devices 1, and a particular one of the devices 52 may be responsive to the result of the logic calculation. The logic calculation may form a part of the further user defined rule set.

The following describes exemplary methods of generating a training dataset and of using the training dataset to train a machine learning model for assessing a characteristic of a plant. The trained machine learning model may be downloaded into the plant health monitoring device 1 and may be selected by a user at column 34 of the user interface shown in FIG. 6.

Figure 9:
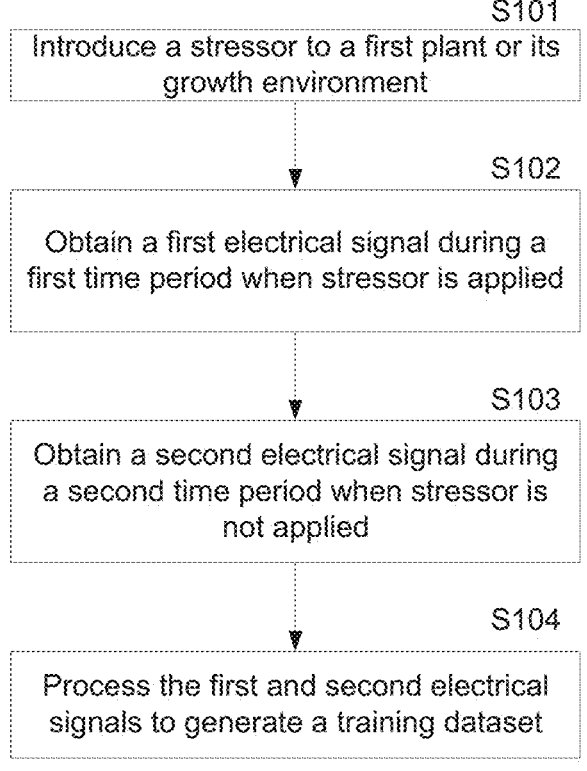
FIG. 9 is a flowchart showing processing steps carried out to generate a training dataset for use to train a machine learning model.

FIG. 9 is a flowchart showing processing steps carried out to generate a training dataset for use to train a machine learning model.

At step S101, a stressor is introduced to a first plant or a growth environment of the first plant. The variety of the first plant and the type of the stressor may be suitably chosen depending upon the needs of a plant grower. In general, the growth environment of the first plant may be growing chambers, greenhouses or fields, and the first plant may be cultivated under controlled conditions to simulate normal growing environments. The stressor is introduced purposely to simulate natural occurrences. The stressor may be any factor which causes a change to the growth environment or the physiology of the first plant.

At step S102, a first electrical signal is obtained from the first plant during a first time period when the stressor is applied to the growth environment of the first plant.

At step S103, a second electrical signal is obtained from the first plant during a second time period when the stressor is not being applied to the growth environment of the first plant.

The first and second electrical signals may be raw data obtained by the leads 6, 8 of the plant health monitoring device 1 described above. Alternatively, the first and second electrical signals may be digitised signals output by the ADC 14 of the plant health monitoring device 1 and may be in the time domain.

At step S104, the first electrical signal and the second electrical signal are processed to generate a training dataset. This step may be carried out by any suitable device(s) to which the first electrical signal and the second electrical signal are provided.

The data processing steps shown in FIG. 5 may be used for process the first and second electrical signals at step S104. After characterising features or spectrogram data are obtained from each data sample at step S13 of FIG. 5, each data sample is labelled with a corresponding characteristic of the first plant. The labels of the data samples may be obtained by monitoring a physiological marker of the first plant and/or an environmental condition of the first plant during the first and second time periods. The physiological marker may include, for example, the leaf turgor pressure, the stage of development of the plant, the stem diameter, the leaf fluorescence, the leaf temperature, and/or the leaf colour, etc. The environmental condition includes, for example, the ambient lighting condition, the ambient $CO_2$ level, the air temperature, and/or the soil water content, etc. The monitoring may be implemented by any suitable sensor available in the market. The particular physiological marker and/or environmental condition being monitored depend upon the nature of the stressor introduced at step S101. Alternatively, the labels of the data samples may be obtained solely based upon the presence and the absence of the stressor.

After the data samples are labelled, normalisation may be applied to the extracted characterising features or the spectrogram data of the data samples obtained across different plants under the same stressor condition. This may be useful to compensate for the inter-plant variability in the extracted features.

After the data processing of FIG. 9 is performed, each data sample obtained at step S12 of FIG. 5 provides one data entry, which includes the extracted characterising features or the spectrogram data of the data sample (i.e., input features) and the corresponding labels (i.e., output features) of the data sample. All of the data entries collectively provide a dataset. The dataset may then be split into a learning dataset (also referred to as a "training dataset") and a validation dataset. The learning dataset may take up to 80% of the whole dataset, and the validation dataset may take up to 20% of the whole dataset.

The training dataset obtained by the processing steps of FIG. 9 may be used to train a machine learning model. The training may be performed by any suitable computer/server. The ML model may be a regression model or a classification model (i.e., a classifier). The classifier may be a binary classifier or a multinomial classifier. Further, the classifier may be a linear classifier. For example, the linear classifier may be Support Vector Machine (SVM) with a linear kernel or may be logistic regression based. Alternatively, the classifier may be a non-linear classifier such as a neural network.

The input variables (X) of the machine learning model may correspond to the input features of the training dataset. The output variables (Y) of the machine learning model may correspond to the type(s) of the output features of the training dataset. Each of the input variables has a corresponding weight, which indicates the strength of the respective input variable in determining the output variables. Training a machine learning model basically means calibrating all of the weights. After the model is trained, the validation dataset may be used to test the performance of the trained model.

In an example, the plant health monitoring device 1 is used to assess whether a plant is suffering from a nematode attack. Nematodes are multicellular insects that feed on plants. Nematodes may cause root knots or galls, injured root tips, excessive root branching, leaf galls, lesions or dying tissue, and twisted, distorted leaves in plants.

Figure 10:
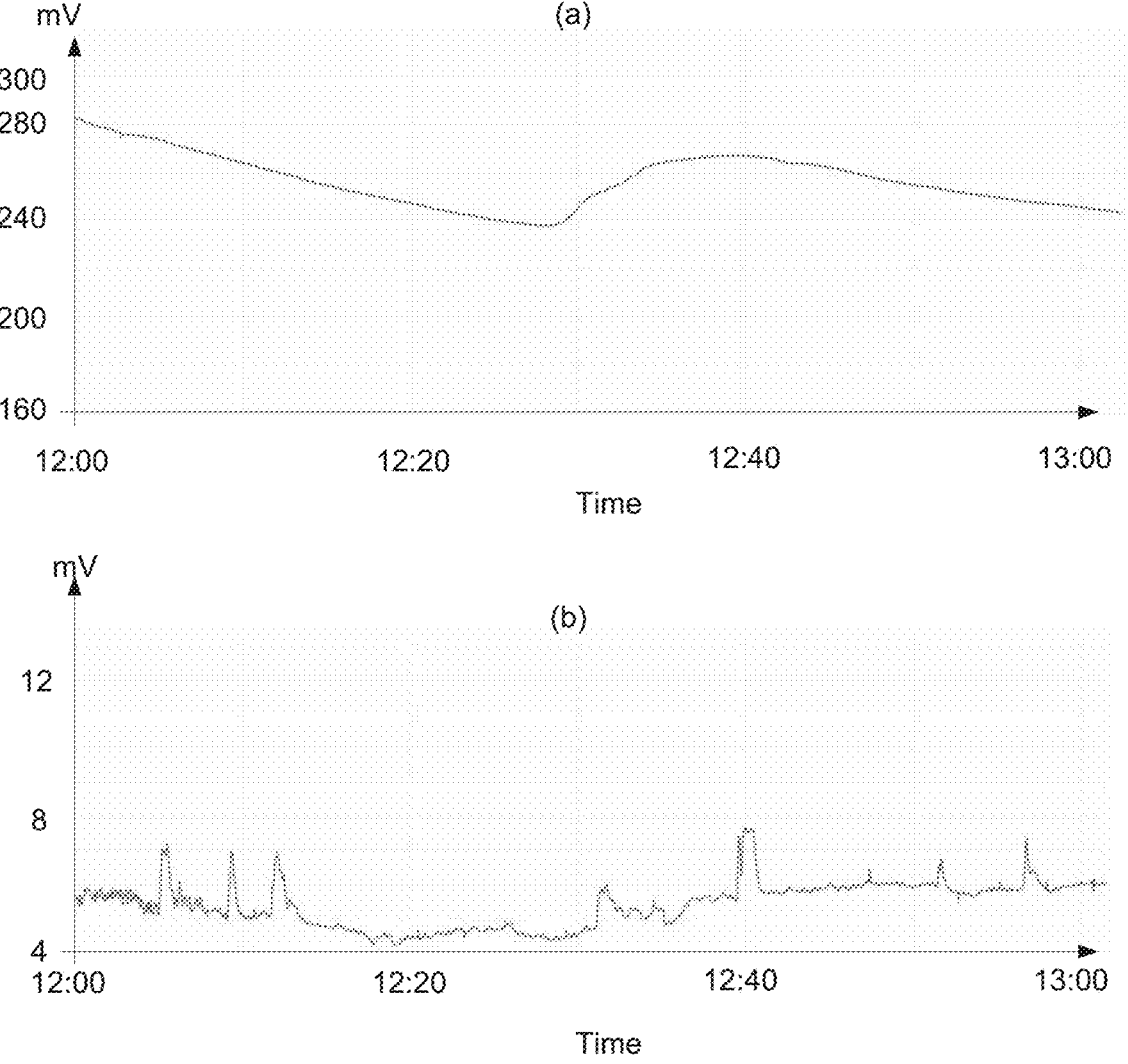
FIG. 10 shows (a) a time-domain waveform of electrical signal obtained from a plant which is not suffering from nematode attack; and (b) a time-domain waveform of electrical signal obtained from a plant which is suffering from nematode attack.

FIG. 10 shows (a) a waveform of electrical signal obtained from a plant which is free from a nematode attack; and (b) a waveform of electrical signal obtained from a plant which is suffering from a nematode attack. Each waveform shows the voltage difference between the capture electrode 7 and the reference electrode 5 which are attached to a respective plant between 12:00 and 13:00 of a day. The Y axis of each waveform indicates the magnitude (unit: mV) of the voltage difference. By comparing the two waveforms, it is clear that the electrical voltage obtained from the suffering plant is of a much lower magnitude, and has more fluctuations, as compared to that obtained from the healthy plant.

Figure 11:
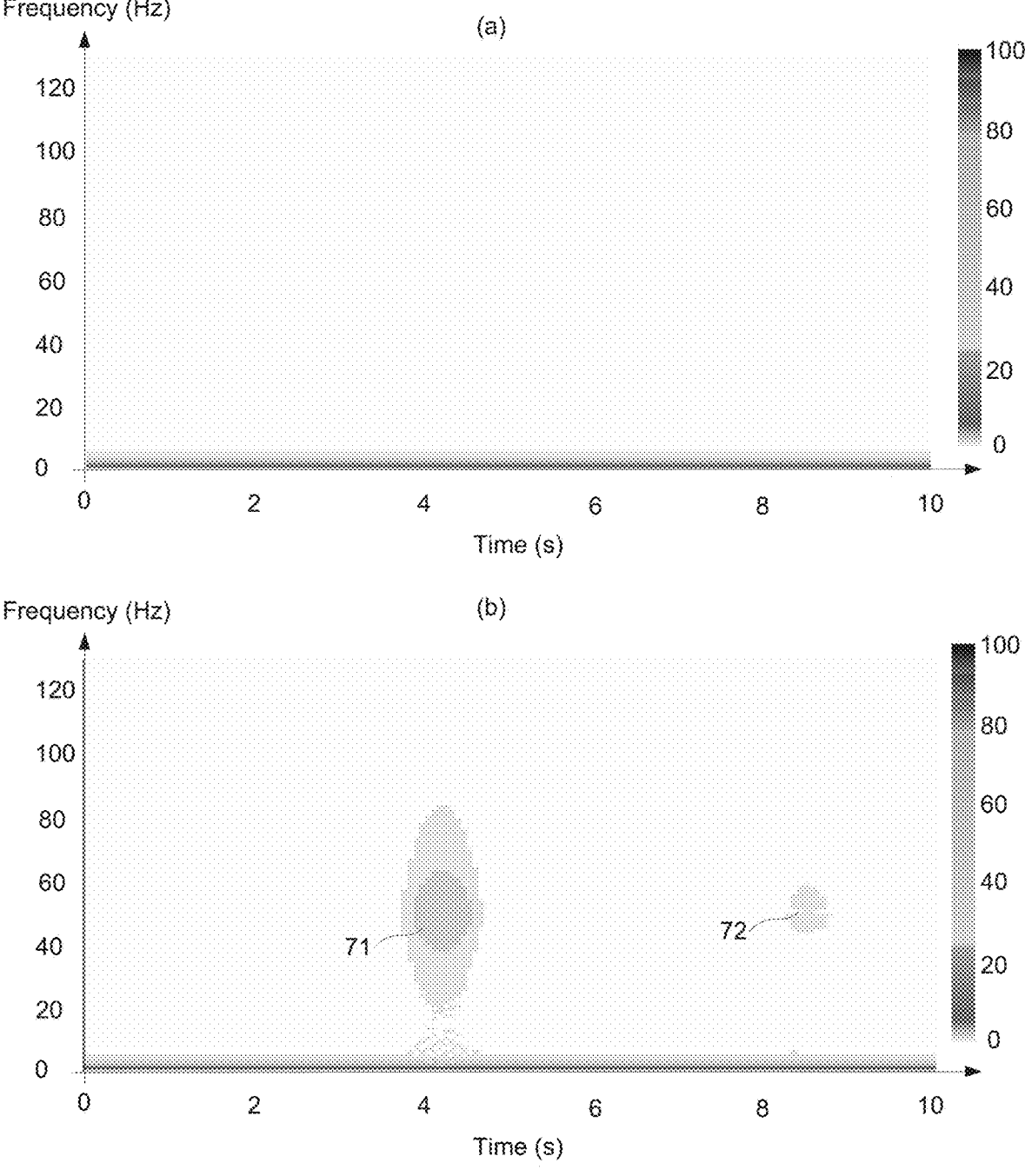
FIG. 11 shows (a) a spectrograph generated from an electrical signal obtained from a plant which is not suffering from nematode attack; and (b) a spectrograph generated from an electrical signal obtained from a plant which is suffering from nematode attack.

The electrical signals are processed according to the processing steps shown in FIG. 5 and described above. In particular, data segments which have a temporal width of 10 seconds are obtained from the electrical signals according to step S12, and spectrogram data are generated for each data segment according to step S13. FIG. 11 shows (a) a spectrograph generated from an electrical signal obtained from a plant which is free from a nematode attack (e.g., a signal similar to that shown in FIG. 10(a)); and (b) a spectrograph generated from an electrical signal obtained from a plant which is suffering from a nematode attack (e.g., a signal similar to that shown in FIG. 10(b)). A spectrograph (which is also called spectrogram) is a visual representation of the spectrum of frequencies of a signal as it varies with time. Each spectrograph of FIG. 11 shows spectrogram data of a respective data segment of 10 s. The X axis of the spectrograph is time. The Y axis of the spectrograph is frequency. The colour scale represents the magnitude according to a legend to the right. By comparing the two spectrographs, it is clear that the electrical signal obtained from the suffering plant has high frequency components 71, 72 which are not present in the electrical signal obtained from the healthy plant.

Figure 12:
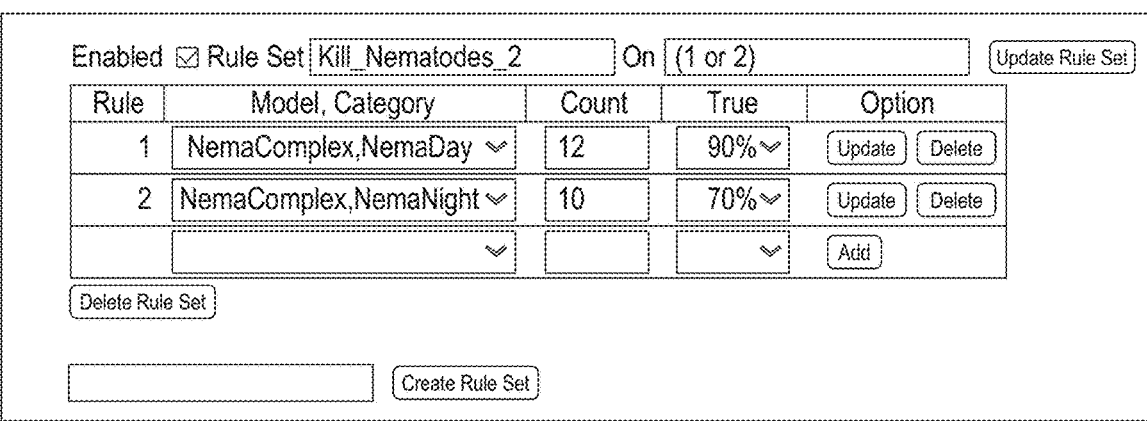
FIG. 12 illustrates an exemplary user interface of the plant health monitoring device which allows a user to input a user-defined rule set in relation to assessing nematode attack in plant.

FIG. 12 illustrates the user interface of the plant health monitoring device 1, and a user has provided an exemplary user-defined rule set in relation to the assessment of nematodes attack in plants. As shown in FIG. 12, the user has created a rule set called "Kill_Nematodes_2" which includes two rules '1' and '2'. Rule '1' makes reference to a characteristic 'NemaDay' of a ML model called 'NemaComplex', and Rule '2' makes reference to a characteristic 'NemaNight' of the ML model 'NemaComplex'. The ML model called 'NemaComplex' has been trained to assess two characteristics of a plant. The two characteristics are whether a plant is suffering from Nematodes attack during the day (corresponding to 'NemaDay'), and whether a plant is suffering from Nematodes attack during the night (corresponding to 'NemaNight'). The user has further entered values under the headers "Count" and "True". The user has also provided a logical argument "(1 or 2)" which means that if Rule '1' is True or Rule '2' is True then the result of rule set is True (i.e., Nematodes exist in the plant or its growth environment).

Figure 13:
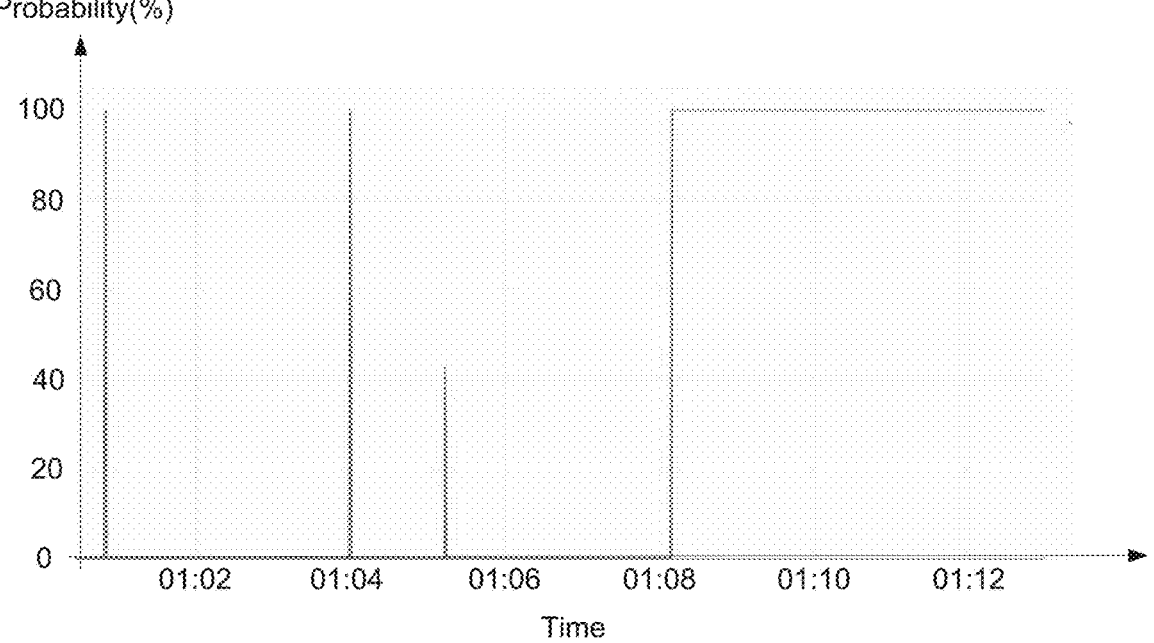
FIG. 13 illustrates an output waveform of a machine learning model which has been trained for assessing whether a plant is suffering from nematode attack.

FIG. 13 illustrates an output waveform of the trained model 'NemaComplex' with the selected characteristic 'NemaNight'. The input data comprises data obtained from plants during periods when nematodes were known to be present, and during periods when no nematodes were present. It will be appreciated that in real life, long-term monitoring is required to access whether a plant is suffering from nematodes attack. In this example, the model 'NemaComplex' is used as a classifier. The Y axis of the waveform indicates the classification probability value, and X axis of the waveform indicates time. The output classification probability value confirms the health statuses of the plants involved, and shows that nematodes are detected at various times throughout the monitored period, including briefly, but with a high confidence at around 01:01 and 01:04, briefly with a low confidence at around 01:05, and then constantly from time 01:08.

In another example, the plant health monitoring device 1 is used to assess whether a plant is suffering from drought (i.e., water deficit). In a particular example, electrical signals are obtained from a group of cherry tomato plants and are further processed according to the steps shown in FIG. 5 to obtain spectrogram data.

Figure 14:
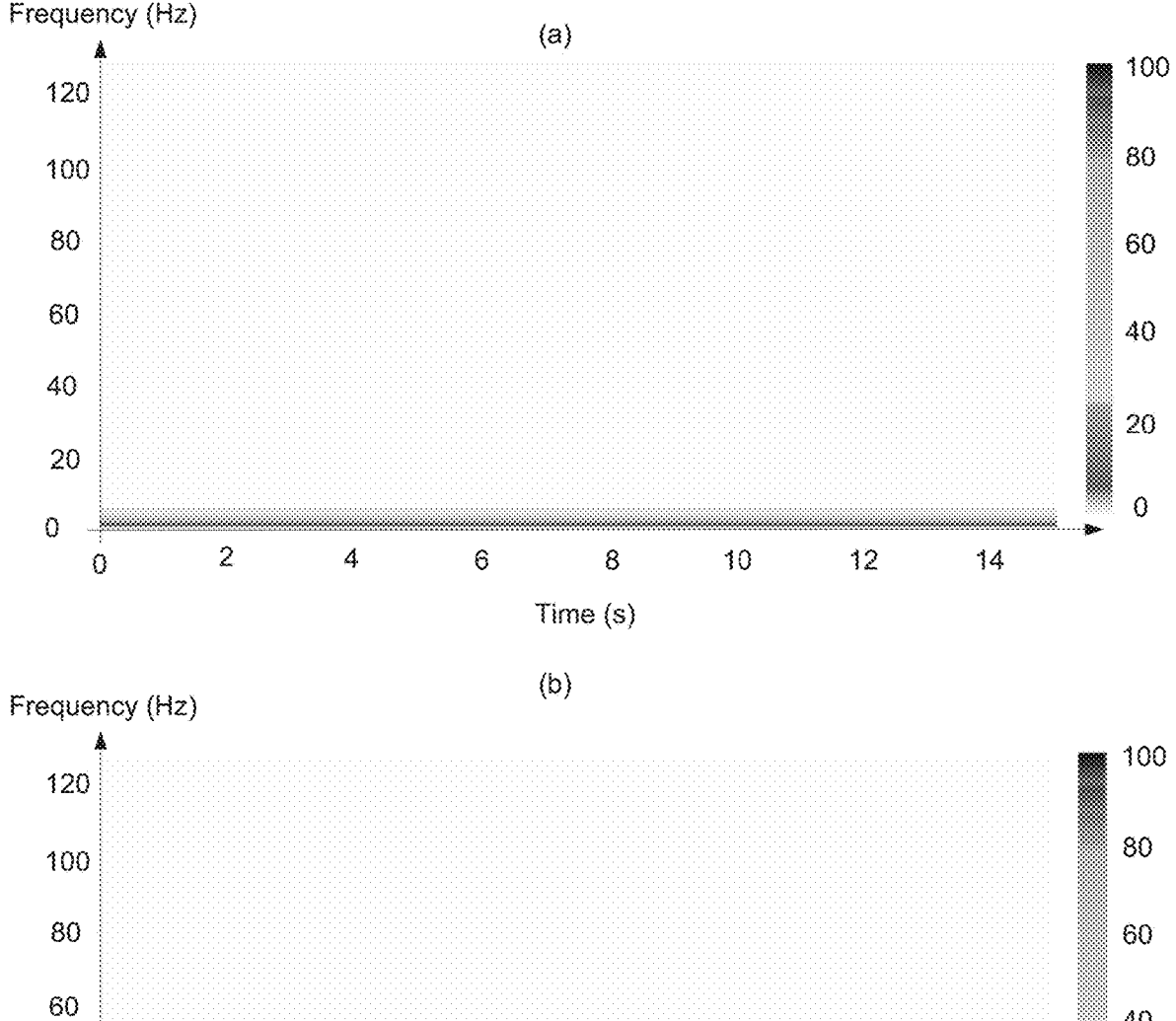
FIG. 14 shows (a) a spectrograph obtained from an electrical signal of a plant which is not in water deficit; and (b) a spectrograph obtained from an electrical signal of a plant which is in water deficit.

FIG. 14 shows (a) a spectrograph obtained from an electrical signal of a cherry tomato plant which is not in water deficit; and (b) a spectrograph obtained from an electrical signal of a cherry tomato plant which is in water deficit. Each spectrograph of FIG. 14 shows spectrogram data of a respective data segment of 15s. The differences of the two spectrographs of FIG. 14 are not discernible to human eyes, but can be detected by ML algorithm.

Figure 15:
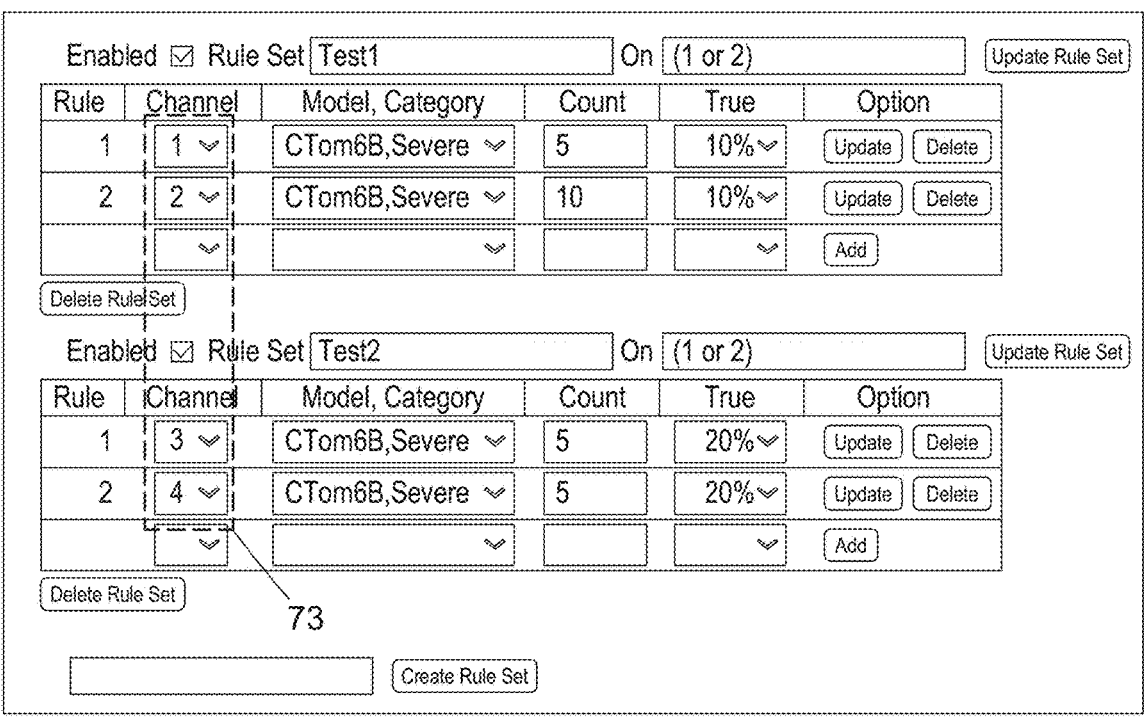
FIG. 15 illustrates an exemplary user interface of the plant health monitoring device which allows a user to input a user-defined rule set in relation to assessing whether a group of plants are suffering from drought.

FIG. 15 illustrates the user interface of the plant health monitoring device 1, and a user has provided an exemplary user-defined rule set in relation to the assessment of drought. As compared to the user interfaces shown in FIGS. 6 and 12, the user interface shown in FIG. 15 includes an additional column 73 under the header "Channel". The plant health monitoring device 1 may have multiple input channels which support the recording of electrical signals from multiple plants simultaneously.

With the column "Channel", the user interface allows a user to activate ML model(s) on any or all of the available channels. In the example shown in FIG. 15, the rule set "Test1" is acting on a first group of two plants connected to Channel '1' and Channel '2' of the plant health monitoring device 1; the rule set "Test2" is acting on a second group of two plants connected to Channel '3' and Channel '4' of the plant health monitoring device 1. By providing a logical argument "1 or 2", the result of the rule set "Test1" (or "Test2") is determined by a combination of the ML outputs generated by each plant within a respective group. There may be one relay controlled by the controller 100 which acts on the result of the rule set "Test1" so as to control the irrigation of the first group of plants. There may be another relay controlled by the controller 100 which acts on the result of the rule set "Test2" so as to control the irrigation of the second group of plants. Other parts of the user interface are similar to those described in relation to FIGS. 6 and 12.

Figure 16:
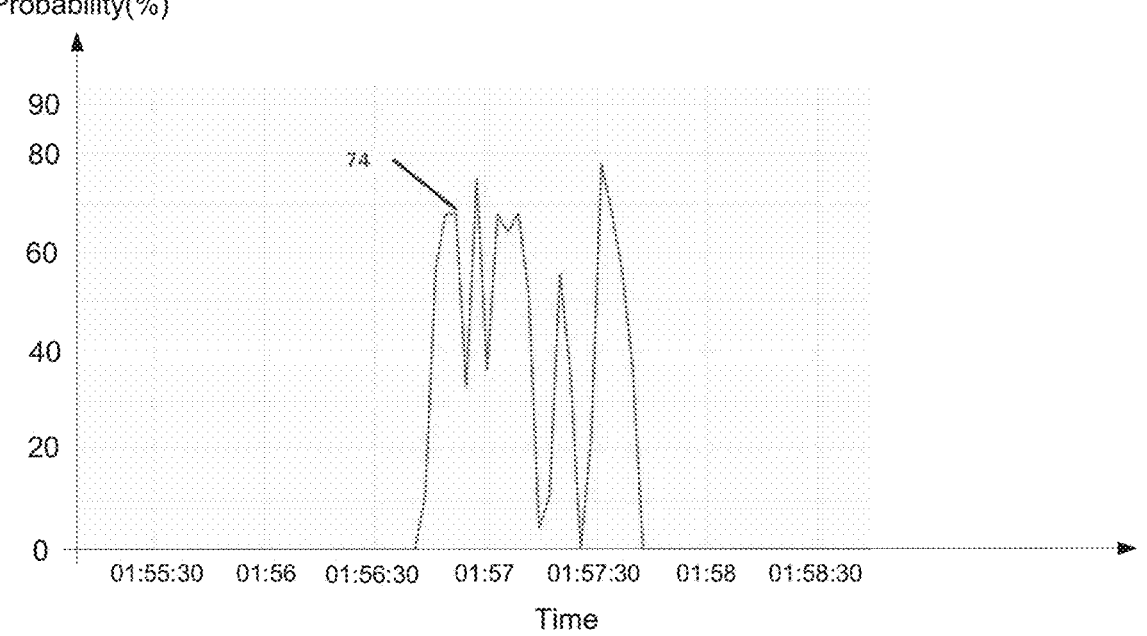
FIG. 16 illustrates an output waveform of a trained machine learning model which has been trained for assessing whether a plant is suffering from drought.

FIG. 16 illustrates an output waveform of the model 'CTom6B' with the selected characteristic 'Severe' as referred to in FIG. 15. The model has been trained to assess whether a plant is water deficit. In this example, the model 'CTom6B' is a classifier. The Y axis of the waveform indicates the classification probability value, and X axis of the waveform indicates time. Under a particular "Count" value (e.g., 10) and "True" value (e.g., 20%), the result of a rule which references the model becomes True shortly after 01:56:30. This in turn triggers a relay which acts on the result of the rule (via the relay controller) to supply water to the plant at a time point 74. Shortly after water is supplied, the detection of water stress in the plant stops before 01:58.

In general terms, it will be understood that where it is described herein that a characteristic of a plant is assessed, such an assessment may also be referred to as a diagnosis (e.g. a diagnosis of a particular health condition of a plant being present). Similarly, an assessment may be referred to as a prediction (e.g. a prediction of a particular condition or status of a plant being present).

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

The invention claimed is:

1. A method of controlling a growth environment of a plant, the method comprising:

obtaining, by at least one processor, an electrical signal from the plant using at least a reference electrode and a capture electrode, the reference electrode being attached to a stem or a root of the plant;

generating, by the at least one processor, using a first of at least one machine learning model, first prediction data based upon the electrical signal, wherein the first of the at least one machine learning model has been trained to assess a first characteristic of the plant, wherein the first prediction data are based upon output(s) of the first of the at least one machine learning model and indicate an assessment of the first characteristic of the plant, and wherein the first prediction data comprises first prediction data items which indicate the assessment of the first characteristic of the plant;

receiving, by the at least one processor via a user interface, a user defined rule set, the user defined rule set including at least:

a first rule which includes a first subset size and a first threshold value for the first characteristic of the plant, the first subset size being a number of a subset of the first prediction data items to use for generating a first prediction result for the first characteristic, the first characteristic being present when the first prediction result meets the first threshold value;

applying, by the at least one processor, the user defined rule set to the first prediction data to generate the first prediction result for the first characteristic of the plant;

generating, by the at least one processor, a plant control signal based at least in part on the first prediction result meeting the first threshold value for the first characteristic of the plant; and controlling, by the at least one processor, operation of at least one device at the growth environment of the plant based on the plant control signal to change the growth environment of the plant, controlling operation of the at least one device comprising changing the operation of the at least one device such that one or more of a throughput, or an output power of the at least one device is increased or decreased or such that the at least one device is switched on or off.

2. The method of claim 1, wherein:

the first prediction result comprises a moving average of the subset of the first prediction data items.

3. The method of claim 1, wherein:

the at least one machine learning model comprises a second machine learning model which has been trained to assess a second characteristic of the plant, and the second characteristic of the plant is different from the first characteristic of the plant; and the method further comprises generating, by the at least one processor, using the second machine learning model, second prediction data based upon the electrical signal, wherein the second prediction data are based upon output(s) of the second machine learning model and indicate an assessment of the second characteristic of the plant, and wherein the second prediction data comprise a plurality of second prediction data items which each indicate the assessment of the second characteristic of the plant.

4. The method of claim 3, wherein:

the user defined rule set further includes a second rule for the second characteristic of the plant, the second rule including a second user input of one or both of a second subset size of a subset of the second prediction data for determining a second prediction result or a second threshold value for the second prediction result for the second characteristic of the plant, the second rule being met when the second prediction result exceeds the second threshold value;

the method further comprising applying, by the at least one processor, the user defined rule set to the second prediction data, wherein applying the user defined rule set comprises performing a logic calculation based upon the first prediction data and the second prediction data, the logic calculation being a result of a logical relationship between the first rule and the second rule, the logical relationship being defined based upon a third user input; and the user defined rule set is configured such that the plant control signal is generated based upon a result of the logic calculation.

5. The method of claim 1, wherein the electrical signal is a first electrical signal, and the plant is a first plant, the method further comprising:

obtaining a second electrical signal from a second plant which is separate from the first plant;

generating, using the at least one machine learning model, further prediction data based upon the second electrical signal; and wherein applying the user defined rule set comprises applying the user defined rule set to the first prediction data and the further prediction data to generate the plant control signal, wherein the plant control signal is configured to change the growth environment of the first plant and the second plant.

6. The method of claim 1, further comprising:

broadcasting the plant control signal.

7. The method of claim 1, further comprising:

applying a further user defined rule set to the at least one device, wherein the at least one device is configured to change the growth environment of the plant based upon the plant control signal and the further user defined rule set.

8. The method of claim 7, wherein the further user defined rule set is configured to apply temporal restrictions to operation of the at least one device.

9. The method of claim 7, wherein the further user defined rule set is configured to at least one selected from the group consisting of:

allow the at least one device to ignore the plant control signal if a predetermined condition is satisfied, and wherein the predetermined condition is set by a fourth user input;

allow the at least one device to ignore the plant control signal for a first length of time immediately after the at least one device is switched off, and wherein the first length of time is set by a fifth user input; and define a maximum length of time for which the at least one device can operate in an ON state, and wherein the maximum length of time is set by a sixth user input.

10. The method of claim 7, wherein:

the at least one device comprises a first device and a second device which is separate from the first device;

applying a further user defined rule set to the at least one device comprises applying a first instance of the further user defined rule set to the first device, and applying a second instance of the further user defined rule set to the second device, wherein the first instance and the second instance are separately defined by a user;

the first device is configured to change the growth environment of the plant based upon the plant control signal and the first instance of the further user defined rule set; and the second device is configured to change the growth environment of the plant based upon the plant control signal and the second instance of the further user defined rule set.

11. The method of claim 8, wherein the temporal restrictions comprise a temporal restriction defining a daily period outside of which the plant control signal is automatically ignored.

12. A computer readable storage medium carrying computer readable instructions arranged to cause a computer to carry out a method according to claim 1.

* * * * *